(12) United States Patent
Nomura

(10) Patent No.: US 9,606,610 B2
(45) Date of Patent: Mar. 28, 2017

(54) APPARATUS FOR CONTROLLING CLOCK SIGNALS TO BE SUPPLIED TO A PLURALITY OF PROCESSING MODULES AND CONTROL METHOD THEREOF

(71) Applicant: CANON KABUSHIKI KAISHA, Tokyo (JP)

(72) Inventor: Osamu Nomura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 14/600,277

(22) Filed: Jan. 20, 2015

(65) Prior Publication Data

US 2015/0205325 A1 Jul. 23, 2015

(30) Foreign Application Priority Data

Jan. 20, 2014 (JP) .................................. 2014-007860

(51) Int. Cl.
| | |
|---|---|
| *G06F 1/04* | (2006.01) |
| *G06F 1/00* | (2006.01) |
| *G06F 15/00* | (2006.01) |
| *G06F 1/32* | (2006.01) |
| *G06K 9/00* | (2006.01) |
| *G06K 9/62* | (2006.01) |

(52) U.S. Cl.
CPC ............ *G06F 1/324* (2013.01); *G06F 1/3243* (2013.01); *G06F 1/3296* (2013.01); *G06K 9/00228* (2013.01); *G06K 9/00986* (2013.01); *G06K 9/00993* (2013.01); *G06K 9/6257* (2013.01); *Y02B 60/1217* (2013.01); *Y02B 60/1239* (2013.01); *Y02B 60/1285* (2013.01)

(58) Field of Classification Search
CPC ..................................................... G06F 1/3203
USPC ........................................................ 713/600
See application file for complete search history.

(56) References Cited

U.S. PATENT DOCUMENTS

| | | | |
|---|---|---|---|
| 6,928,566 B2 * | 8/2005 | Nunomura ............ | G06F 1/3203 713/322 |
| 8,754,896 B2 * | 6/2014 | Watanabe ............. | G06F 9/3875 345/506 |
| 8,819,396 B2 * | 8/2014 | Usuba ...................... | G06T 1/20 712/32 |

(Continued)

FOREIGN PATENT DOCUMENTS

JP      2002-215599 A      8/2002

*Primary Examiner* — Suresh Suryawanshi
(74) *Attorney, Agent, or Firm* — Canon U.S.A., Inc. IP Division

(57) ABSTRACT

An information processing apparatus includes a plurality of processing units each configured to execute predetermined processing on input data in parallel and calculate an evaluation value based on the executed processing, an estimation unit configured to perform estimation of a processing time required for each of the plurality of the processing units to perform the predetermined processing based on the evaluation values calculated by the relevant processing unit and at least one other processing unit of the plurality of the processing units, and a clock control unit configured to, with respect to each of the processing units, determine a frequency of a clock signal to be supplied to the relevant processing unit in response to the estimated processing time of the relevant processing unit and supply the clock signal having the determined frequency.

11 Claims, 21 Drawing Sheets

(56) References Cited

U.S. PATENT DOCUMENTS 8,972,769 B2 * 3/2015 Nakagawa ............ G06F 1/3203
713/600

* cited by examiner

| | V0 | V1 | V2 | V3 | V4 | V5 | V6 | V7 |
|---|---|---|---|---|---|---|---|---|
| EVALUATION VALUE | 50 | 70 | 80 | 50 | 70 | 40 | 70 | 80 |
| DETERMINATION RESULT | FALSE | TRUE | TRUE | FALSE | TRUE | FALSE | TRUE | TRUE |
| ESTIMATION PROCESSING TIME | LONG | LONG | LONG | LONG | LONG | LONG | LONG | LONG |

FIG.8A

| | V0 | V1 | V2 | V3 | V4 | V5 | V6 | V7 |
|---|---|---|---|---|---|---|---|---|
| EVALUATION VALUE | ... | 40 | 30 | 70 | 20 | 40 | ... | ... |
| DETERMINATION RESULT | ... | FALSE | FALSE | TRUE | FALSE | FALSE | ... | ... |
| ESTIMATION PROCESSING TIME | ... | ... | ... | SHORT | ... | ... | ... | ... |

FIG.8B

| | V0 | V1 | V2 | V3 | V4 | V5 | V6 | V7 |
|---|---|---|---|---|---|---|---|---|
| EVALUATION VALUE | 70 | 30 | 20 | ... | ... | 40 | 50 | 80 |
| DETERMINATION RESULT | TRUE | FALSE | FALSE | ... | ... | FALSE | FALSE | TRUE |
| ESTIMATION PROCESSING TIME | SHORT | ... | ... | ... | ... | ... | ... | SHORT |

FIG.8C

| | V0 | V1 | V2 | V3 | V4 | V5 | V6 | V7 |
|---|---|---|---|---|---|---|---|---|
| EVALUATION VALUE | 50 | 70 | 50 | 20 | 20 | 40 | 70 | 20 |
| DETERMINATION RESULT | FALSE | TRUE | FALSE | FALSE | FALSE | FALSE | TRUE | FALSE |
| ESTIMATION PROCESSING TIME | SHORT | SHORT | SHORT | SHORT | SHORT | SHORT | SHORT | SHORT |

FIG.15

| RANGE OF T | CLOCK FREQUENCY |
|---|---|
| $0.0 \leq T < 0.1$ | 40 Hz |
| $0.1 \leq T < 0.2$ | 80 Hz |
| $0.2 \leq T < 0.3$ | 120 Hz |
| $0.3 \leq T < 0.4$ | 160 Hz |
| $0.4 \leq T < 0.5$ | 200 Hz |
| $0.5 \leq T < 0.6$ | 240 Hz |
| $0.6 \leq T < 0.7$ | |

FIG.20A

| | V0 | V1 | V2 | V3 | V4 | V5 | V6 | V7 |
|---|---|---|---|---|---|---|---|---|
| EVALUATION VALUE | ... | 70 | 80 | 50 | 70 | 40 | ... | ... |
| DETERMINATION RESULT | ... | TRUE | TRUE | FALSE | TRUE | FALSE | ... | ... |
| ESTIMATION PROCESSING TIME | ... | ... | ... | LONG | ... | ... | ... | ... |

FIG.20B

| | V0 | V1 | V2 | V3 | V4 | V5 | V6 | V7 |
|---|---|---|---|---|---|---|---|---|
| EVALUATION VALUE | ... | 40 | 30 | 70 | 20 | 40 | ... | ... |
| DETERMINATION RESULT | ... | FALSE | FALSE | TRUE | FALSE | FALSE | ... | ... |
| ESTIMATION PROCESSING TIME | ... | ... | ... | SHORT | ... | ... | ... | ... |

APPARATUS FOR CONTROLLING CLOCK SIGNALS TO BE SUPPLIED TO A PLURALITY OF PROCESSING MODULES AND CONTROL METHOD THEREOF

BACKGROUND OF THE INVENTION

Field of the Invention

The present invention relates to an apparatus for controlling clock signals to be supplied to a plurality of processing modules and a control method thereof.

Description of the Related Art

A technique for controlling a frequency of a clock signal and a power source voltage value to be supplied to a processing module is discussed for optimizing a processing time and reducing power consumption in a system including a plurality of processing modules capable of performing processing in parallel. For example, Japanese Patent Application Laid-Open No. 2002-215599 discusses a multiprocessor system in which a processor A and a processor B respectively execute a program A and a program B in parallel and synchronize with each other after the processing. In this system, for example, the processor A changes a frequency of an input clock signal according to a ratio between a processing time estimated value Ta of the program A and a processing time estimated value Tb of the program B and changes a power source voltage to be supplied according to the frequency of the clock signal. Accordingly, power consumption of the processor A is reduced.

The above-described technique controls a frequency of a clock signal and a power source voltage to be supplied in next processing according to a previously estimated ratio of processing time estimated values or a previous processing time of each processor. According to the above-described technique, it is difficult to appropriately control a frequency of a clock signal and a power source voltage to be supplied to a processing module in processing in which a processing time varies depending on input data, for example.

SUMMARY OF THE INVENTION

The present invention is directed to the provision of an information processing apparatus capable of controlling a frequency of a clock signal to be supplied to each processing module according to a status of processing being executed and a control method thereof in consideration of the above-described issue.

According to an aspect of the present invention, an information processing apparatus includes a plurality of processing units each configured to execute predetermined processing on input data in parallel and calculate an evaluation value based on the executed processing, an estimation unit configured to perform estimation of a processing time required for each of the plurality of the processing units to perform the predetermined processing based on the evaluation values calculated by the relevant processing unit and at least one other processing unit of the plurality of the processing units, and a clock control unit configured to, with respect to each of the processing units, determine a frequency of a clock signal to be supplied to the relevant processing unit in accordance with the estimated processing time of the relevant processing unit and supply the clock signal having the determined frequency.

Further features of the present invention will become apparent from the following description of exemplary embodiments with reference to the attached drawings.

BRIEF DESCRIPTION OF THE DRAWINGS

FIG. 7 is a processing example according to the first exemplary embodiment.

FIGS. 8A to 8C are processing examples according to the first exemplary embodiment.

FIG. 15 is an example of a frequency table according to a fifth exemplary embodiment.

FIGS. 20A and 20B are processing examples according to the sixth exemplary embodiment.

DESCRIPTION OF THE EMBODIMENTS

Exemplary embodiments of the present invention are described below with reference to the drawings.

Figure 21:
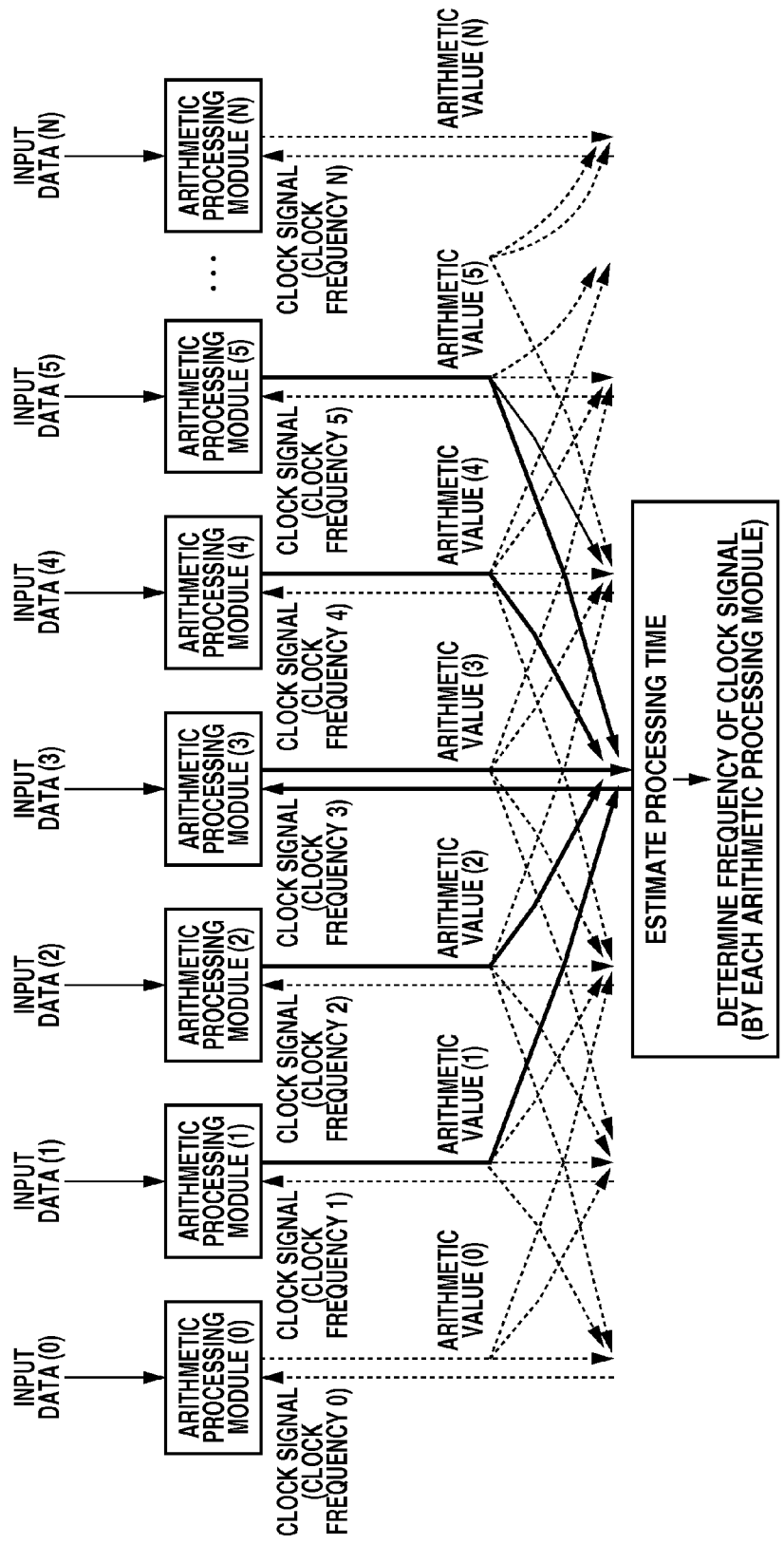
FIG. 21 illustrates an example of a parallel processing processor including a plurality of arithmetic processing modules.

Key concepts of the exemplary embodiments are first described below for describing a parallel processing processor as an information processing apparatus according to the exemplary embodiments of the present invention. FIG. 21 is a schematic diagram of a parallel processing processor including a plurality of arithmetic processing modules which execute same processing on different data pieces.

An arithmetic processing module <i> (i=0, 1, ..., N) executes predetermined processing on input data <i> and outputs it. The predetermined processing executed by the arithmetic processing module is processing of which processing time varies depending on the input data. The predetermined processing includes, for example, arithmetic processing including determination of termination of the calculation, and arithmetic processing in which a specific pattern is detected from the input data and a processing time thereof varies according to a number of the detected specific patterns Since the processing times are not fixed in each of the arithmetic processing modules, processing finish times vary among the arithmetic processing modules, and efficiency of the parallel processing is reduced by a stall of the arithmetic processing modules or the like. In this regard, a method can be considered which estimates a processing time of the each arithmetic processing module by referring to a processing status of the each arithmetic processing module and increases or decreases a frequency of a clock signal supplied to the each arithmetic processing module in response to the estimated processing time.

If the processing status of the arithmetic processing module is reflected to an arithmetic value in the arithmetic processing being executed, the processing status of the arithmetic processing module can be determined by referring to an evaluation value based on the arithmetic value. However, if an evaluation value is based on an arithmetic value of only a target arithmetic processing module, the arithmetic value just reflects a temporary arithmetic processing status regarding data input to the target arithmetic processing module, so that a relationship between the evaluation value and a final processing time may be low in some cases. Therefore, when a processing time of an arithmetic processing module is estimated, the parallel processing processor according to the present exemplary embodiments refers to not only an evaluation value of the arithmetic processing module but also an evaluation value of another arithmetic processing module which executes processing in parallel.

Further, according to the present exemplary embodiments, data pieces input to each of the arithmetic processing modules are presumed that they are spatially or temporally adjacent to each other. Generally, data pieces spatially or temporally adjacent to each other are highly likely to have similar data characteristics. For example, in a case where a partial area is clipped out of image data, partial areas close to each other on the image (including a case that the areas overlap with each other) generally have data characteristics close to each other.

Therefore, when a processing time of an arithmetic processing module is estimated, a processing time reflecting characteristics of input data can be estimated by referring to an evaluation value of another arithmetic processing module which uses input data at least spatially or temporally adjacent to the input data of the relevant arithmetic processing module as an arithmetic processing target. For example, in a case that input data is image data, a local noise on an image may temporarily lower a correlation between a final processing result and an evaluation value in an arithmetic processing module which handles a partial area including a noise as input data. If such case occurs, a processing time can be estimated without being affected by a temporary impact of a noise by referring to an evaluation value in another arithmetic processing module which handles a partial area not including an adjacent noise as input data.

As described above, the parallel processing processor according to the present exemplary embodiments mutually refers to evaluation values based on arithmetic values of each of arithmetic processing modules which process data pieces spatially or temporally adjacent to each other and estimates a processing time. Then, the parallel processing processor determines and controls a frequency of a clock signal supplied to each of the arithmetic processing modules based on the estimated processing time, so that variations in processing finish times among the arithmetic processing modules can be reduced and efficiency of the parallel processing can be improved.

Then the exemplary embodiments of the present invention are described in more detail below with reference to the drawings.

A first exemplary embodiment of the present invention is described. According to the first exemplary embodiment, a parallel processing processor including a plurality of arithmetic processing modules controls a frequency of a clock signal supplied to each of the arithmetic processing modules based on an evaluation value reflecting a status of processing being executed in each of the arithmetic processing modules.

Figure 1:
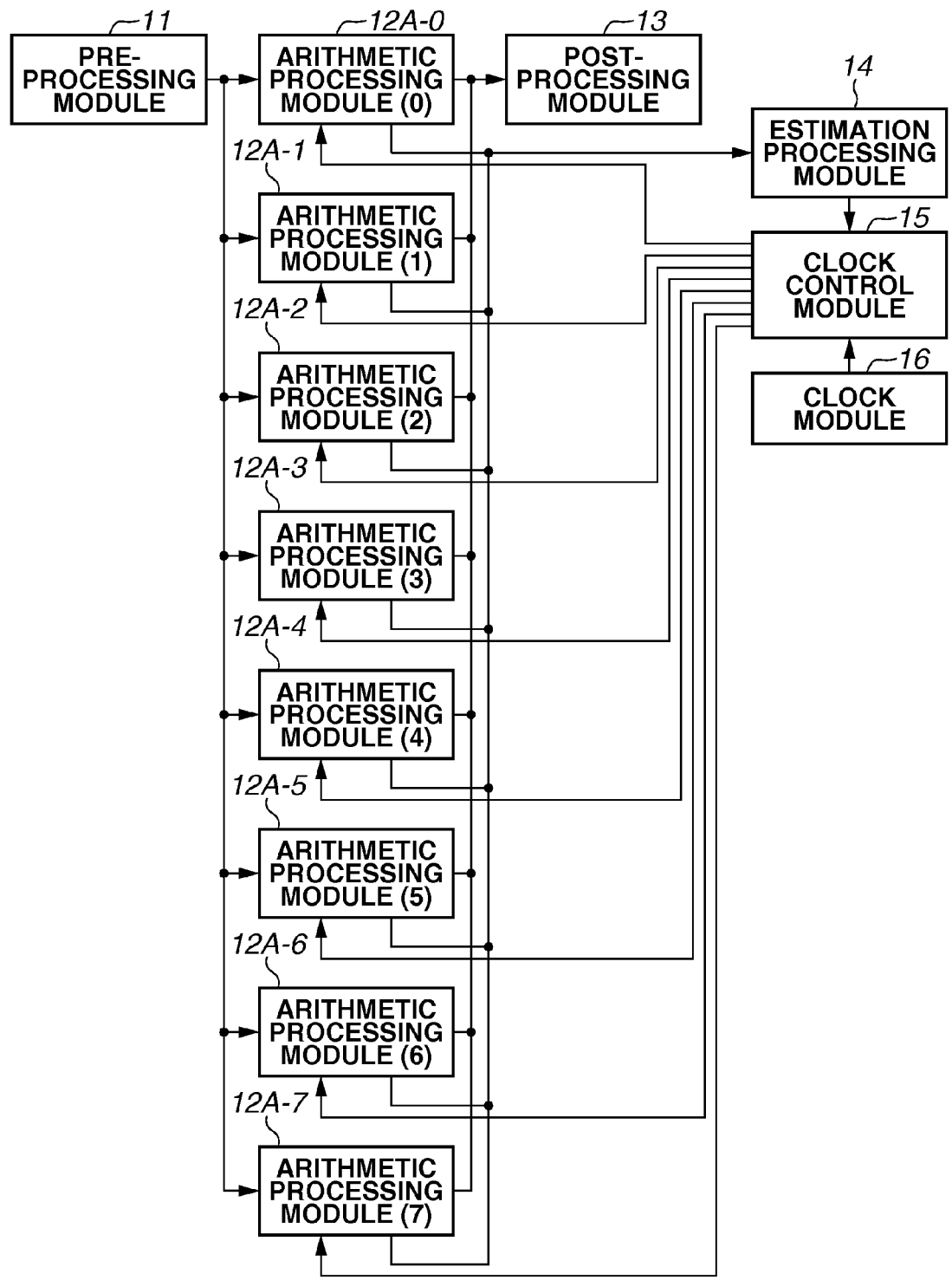
FIG. 1 illustrates a configuration example of an information processing apparatus according to a first exemplary embodiment.

FIG. 1 is a block diagram illustrating a configuration example of the parallel processing processor as an information processing apparatus according to the first exemplary embodiment. The parallel processing processor according to the first exemplary embodiment includes a pre-processing module 11, a plurality of arithmetic processing modules 12A (12A-0 to 12A-7), a post-processing module 13, an estimation processing module 14, a clock control module 15, and a clock module 16.

With respect to data input to the parallel processing processor, the pre-processing module 11 executes predetermined pre-processing, the plurality of the arithmetic processing modules 12A executes predetermined arithmetic processing in parallel, and the post-processing module 13 executes predetermined post-processing. The estimation processing module 14 estimates a processing time of each arithmetic processing module 12A based on an evaluation value corresponding to a status of processing being executed. The evaluation value is calculated in the each arithmetic processing module 12A when the processing is being executed.

The clock control module 15 generates clock signals to be supplied to the plurality of the arithmetic processing modules 12A based on a reference clock signal. In addition, the clock control module 15 determines a frequency of the clock signal supplied to the each arithmetic processing module 12A according to the processing time of the arithmetic processing module 12A estimated by the estimation processing module 14. The clock module 16 generates the reference clock signal supplied to the clock control module 15.

According to the first exemplary embodiment, the parallel processing processor executes face detection processing for detecting a human face as an example of processing. More specifically, the pre-processing module executes pre-processing for calculating an integral image on an input image. The plurality of arithmetic processing modules 12A-0 to 12A-7 each perform cascade type detection processing for detecting a human face in parallel based on the integral image calculated by the pre-processing module 11. The post-processing module 13 executes post-processing for integrating detection results calculated by the respective arithmetic processing modules 12A-0 to 12A-7. The face detection processing is described as an example of processing, and processing executed by the parallel processing processor is not limited to this.

Figure 2:
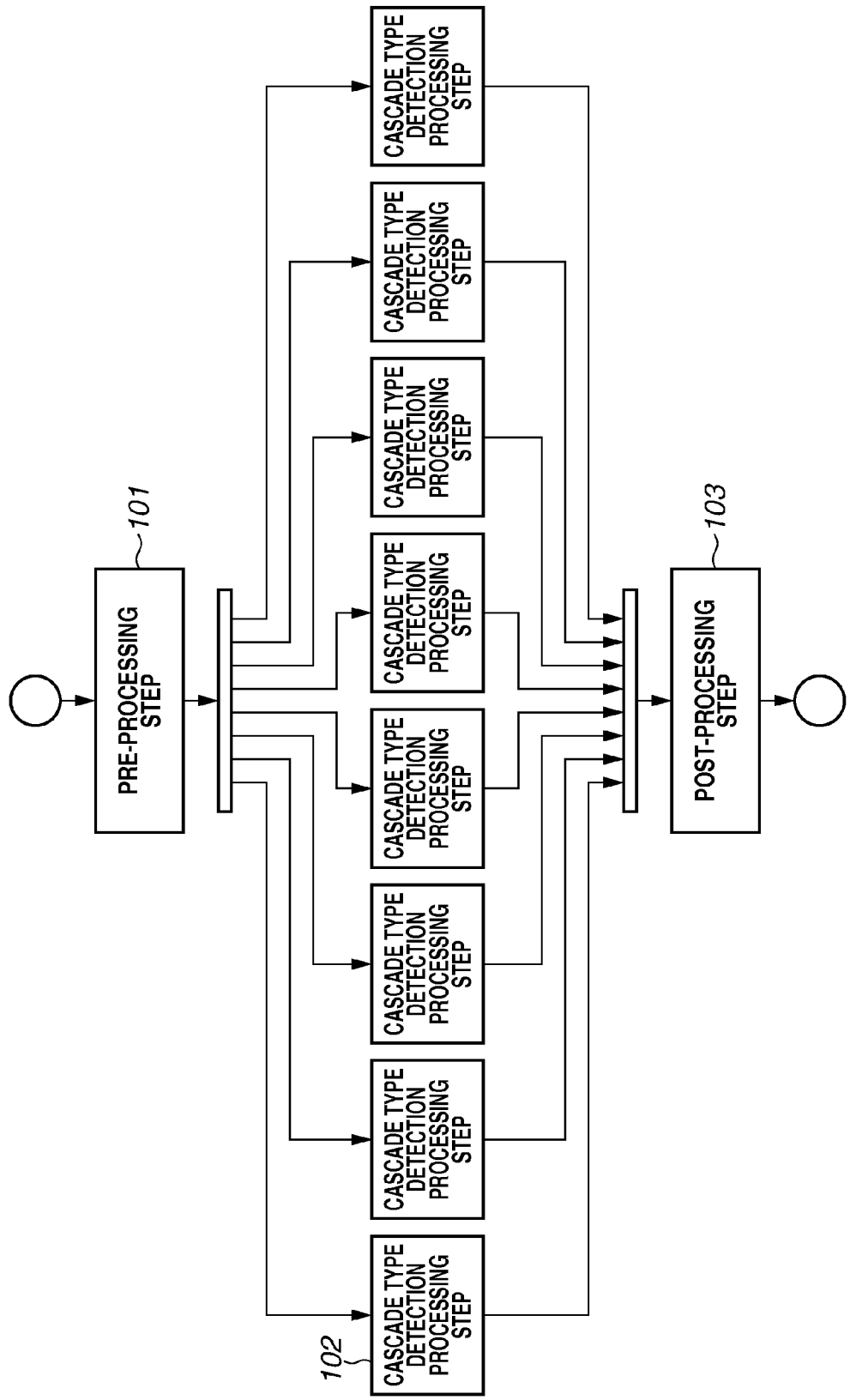
FIG. 2 is a flowchart illustrating face detection processing according to the first exemplary embodiment.

An outline of face detection processing executed by the parallel processing processor according to the first exemplary embodiment is described below. FIG. 2 is a flowchart illustrating the face detection processing according to the first exemplary embodiment. The face detection processing according to the present exemplary embodiment employs a method based on a processing algorithm, which has been widely practiced, described in the following reference.

Reference 1: Viola, P. & Jones, M. (2001). Rapid object detection using a boosted cascade of simple features. In IEEE Computer Vision and Pattern Recognition (pp. I:511-518).

The relevant technique is described in detail in the above-mentioned reference 1 and other references, thus a part necessary for descriptions of the present exemplary embodiment is only described below. As illustrated in FIG. 2, the face detection processing according to the present exemplary embodiment includes a pre-processing step 101 for calculating an integral image with respect to input image data, a cascade type detection processing step 102 for detecting a human face, and a post-processing step 103 for integrating detection results of the detected human face. According to the present exemplary embodiment, the plurality of the arithmetic processing modules executes the cascade type detection processing step 102 in parallel, so that a plurality of the cascade type detection processing steps 102 is illustrated. According to the present exemplary embodiment, eight arithmetic processing modules 12A are mounted, and thus eight cascade type detection processing steps 102 are illustrated in FIG. 2.

In FIG. 2, the pre-processing step 101 is performed on image data obtained by a camera or the like. The pre-processing step 101 calculates integral image data from the input image data using a method, for example, similar to that of the reference 1. Then, in the cascade type detection processing step 102, cascade type detection processing is executed based on the integral image data calculated in the pre-processing step 101. In this regards, eight cascade type detection processing steps 102 are executed in parallel as described above, and in each of the processing steps, the cascade type detection processing step 102 is parallelly executed in units of scan window area shifted by predetermined pixels from an original image.

A scan window area is described below. As described in the reference 1, a size of a detection target object is often smaller than a size of an original image in image detection processing. Thus, an area corresponding to the size of the detection target object is set as a scan window area for executing the detection processing.

Figure 3:
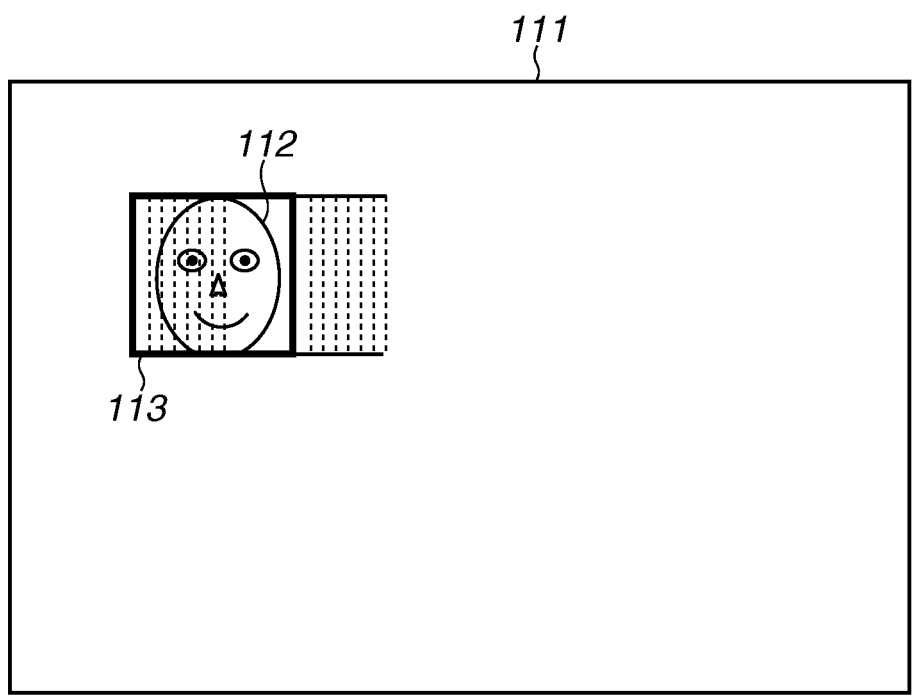
FIG. 3 illustrates an example of a scan window.

In an example illustrated in FIG. 3, a scan window 113 is set as an area corresponding to a size of a face 112 as a detection target object in an input image 111. The above-described eight cascade type detection processing steps 102 each are in charge of the cascade type detection processing corresponding to one single scan window area. Further, each of the cascade type detection processing steps 102 handles the processing on consecutive scan window areas which are shifted by predetermined pixels from each other. A shifted amount of the scan window can be variously set according to an application. According to the present exemplary embodiment, the scan window is shifted from each other by one pixel in a raster scan direction as illustrated in FIG. 3.

Figure 4:
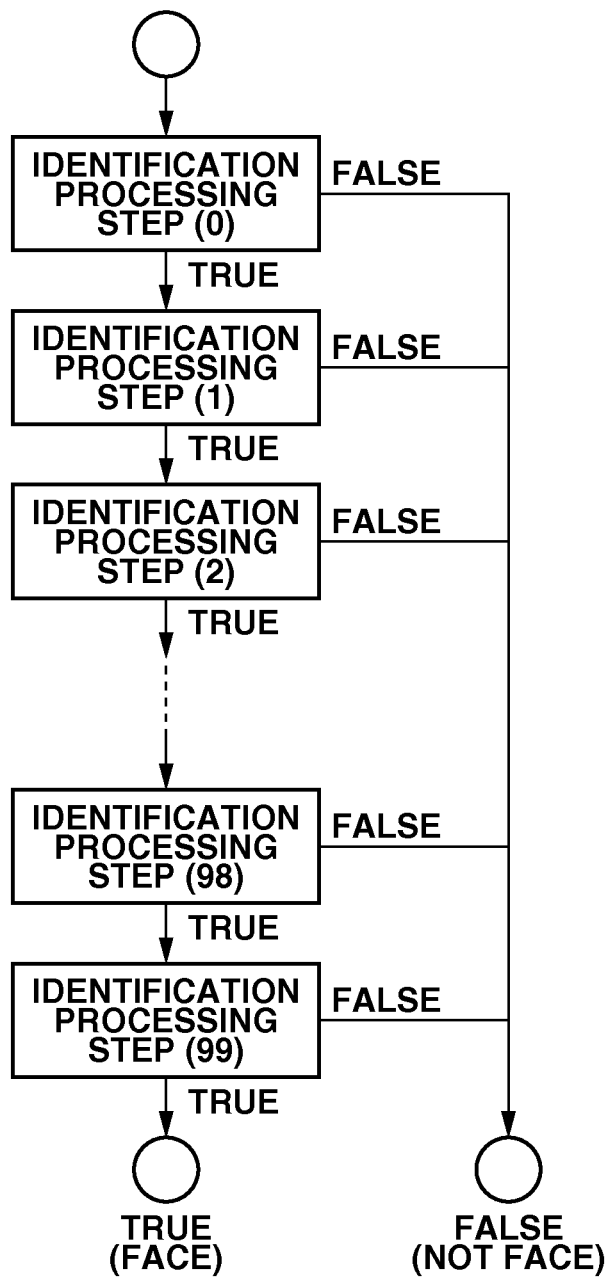
FIG. 4 is a flowchart illustrating a processing example in a cascade type detection processing step.

Processing executed in each of the cascade type detection processing steps 102 is described in below with reference to a flowchart illustrated in FIG. 4. As illustrated in FIG. 4, the cascade type detection processing step 102 includes an identification processing step <0>, an identification processing step <1>, an identification processing step <2>, . . . , and an identification processing step <99> which are arranged in a cascade state. In each of the identification processing steps, it is determined whether an image in the scan window area is a detection target object (a human face in the present exemplary embodiment).

Figure 5A:
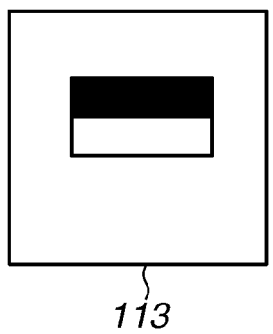
FIGS. 5A to 5C illustrate examples of Haar-Like features.
Figure 5B:
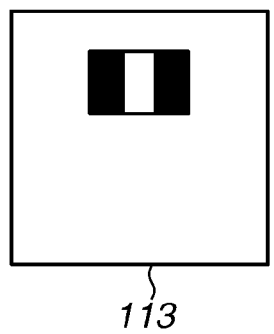
Figure 5C:
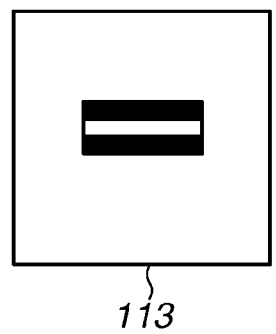

In the identification processing step, Haar-Like features as shown in FIGS. 5A to 5C are calculated using a method, for example, similar to that of the reference 1 based on the integral image data calculated in the pre-processing step 101. FIGS. 5A to 5B shows three types of Haar-Like features on the scan window 113 as examples.

Then, in the identification processing step, identification processing is performed using the calculated Haar-Like features. In this regard, a method is employed in which the Haar-Like features calculated in each of the identification processing steps are accumulated to calculate an identification evaluation value, and the identification evaluation value is compared with a predetermined threshold value set in advance in each of the identification processing step. The predetermined threshold value is determined by learning processing performed in advance, as is the case with the reference 1. More specifically, when the identification evaluation value is less than the threshold value, a determination result becomes False (not a face) and the processing is terminates. To the contrary, when the identification evaluation value is greater than the threshold value, a determination result becomes True (a face) and the processing is continued. Thus, next identification processing step is executed.

When all of the identification processing steps (the identification processing step <0> to the identification processing step <99> in the example illustrated in FIG. 4) finally determine the determination results as True (a face), it is determined that the image in the scan window area is a human face. Thus, the detection result of the relevant scan window area is regarded as True (a face is detected) in the cascade type detection processing step. On the other hand, when the processing is terminated (including a case that it is determined as False in the last identification processing step <99>), the detection result of the relevant scan window area is regarded as False (a face is not detected) in the cascade type detection processing step.

According to the present exemplary embodiment, the identification processing steps arranged in the cascade state are executed step by step in the serial order in the arithmetic processing module 12A illustrated in FIG. 1. A processing time of the cascade type detection processing step as illustrated in FIG. 4 varies according to whether the processing is terminated in any step in the identification processing steps arranged in the cascade state (or not terminated until the last step). Therefore, a processing time of the cascade type detection processing step varies according to input data, and thus an arithmetic processing time is not fixed before execution of the processing.

Figure 6:
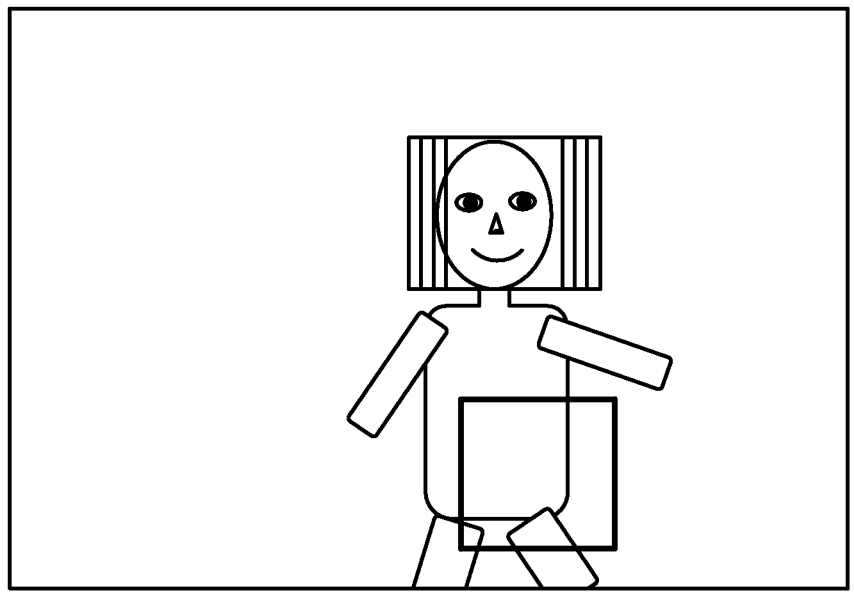
FIG. 6 illustrates an example of a detection result according to the first exemplary embodiment.

In the post-processing step 103 next to the cascade type detection processing step 102, detection results in the plurality of the cascade type detection processing steps 102 are integrated. As illustrated in FIG. 6, for example, detection results in the cascade type detection processing steps often become True in general in a plurality of scan window areas in the vicinity of a detection target object (a human face in the present exemplary embodiment) in an image. This can be easily inferred from a fact that when a scan window area is set by being shifted from each other by one pixel as in the present exemplary embodiment, image data pieces included in the adjacent scan window areas are similar to each other.

Thus, the post-processing step 103 integrates the detection results overlappingly detected in the cascade type detection processing steps 102 to bring the detection results of the same detection target object together into one. For example, a plurality of detection results of a plurality of pixels adjacent to each other in an image is merged into one as a result detected at a nearest neighbor pixel position of a position of the center of gravity of the plurality of pixels. Accordingly, a plurality of detection results of a detection target object can be merged into one. The face detection processing executed by the parallel processing processor according to the first exemplary embodiment is described above.

Next, a method is described which is for controlling a frequency of a clock signal to be supplied to the arithmetic processing module 12A when the above-described cascade type detection processing step 102 1s executed. As described above, the plurality of the arithmetic processing modules 12A executes the cascade type detection processing steps 102 in parallel on the scan window areas that the respective modules handle. At that time, each of the arithmetic processing modules 12A outputs to the estimation processing module 14 the identification evaluation value calculated in each identification processing step in the cascade type detection processing step 102. The estimation processing module 14 stores the identification evaluation values input from each of the arithmetic processing modules 12A.

The estimation processing module 14 executes processing for estimating a processing time of the cascade type detection processing step 102 being executed in the each arithmetic processing module 12A based on the stored identification evaluation values of the plurality of the arithmetic processing modules 12A and combinations thereof. In the descriptions below, the estimation processing module 14 estimates a processing time of the arithmetic processing module 12A in three types, namely Long, Middle, and Short.

For example, a case is assumed in which identification evaluation values V0 to V7 of the respective arithmetic processing modules 12A-0 to 12A-7 are as indicated in FIG. 7 in the identification processing step (for example, an identification processing step <9> which is tenth step from the beginning) with respect to certain image data. These data pieces are output from the respective arithmetic processing modules 12A-0 to 12A-7 and stored in the estimation processing module 14.

When a processing time of the each arithmetic processing module 12A is estimated, there is a method for comparing an identification evaluation value regarding processing being executed in the each arithmetic processing module 12A with a predetermined threshold value set in advance in each identification processing step. The predetermined threshold value is statistically determined by performing test processing using a large amount of sample image data in advance. For example, the identification processing steps are executed using only images capturing a human face, and an average value calculated from identification evaluation values in each of the identification processing steps is determined as the threshold value.

As an example, it is assumed that an average value of identification evaluation values in the tenth identification processing step <9> is 60 in the test processing performed in advance, and the average value is set as a threshold value $\theta_{10}$ in advance. In this case, an identification evaluation value V2 (=80) output from the arithmetic processing module <2> 12A-2 in the middle of the identification processing step with respect to certain image data illustrated in FIG. 7 is greater than the threshold value $\theta_{10}$ (=60). Therefore, the cascade type detection processing step being executed in the arithmetic processing module <2> 12A-2 is statistically highly likely to detect a face, and thus it can be expected that the identification processing step is continued.

On the other hand, an identification evaluation value V3 (=50) output from the arithmetic processing module <3> 12A-3 is less than the threshold value $\theta_{10}$ (=60). When determination is made based on only the identification evaluation value V3, the cascade type detection processing step being executed in the arithmetic processing module <3> 12A-3 is statistically less likely to detect a face, and thus it is expected that the identification processing step is highly likely to be terminated in midstream. However, as described above, detection results in the cascade type detection processing steps generally become True with respect to a plurality of scan window areas by being concentrated on the vicinity of a detection target object (a human face in the present exemplary embodiment) in an image.

Therefore, if scan window areas having large identification evaluation values are concentrated in the vicinity of a certain scan window area having a small identification evaluation value, the estimation processing module 14 determines that the identification processing step in the certain scan window area is also highly likely to be continued. In other words, it is regarded that the identification evaluation value of the certain scan window area becomes temporarily small and will change similarly to the identification evaluation values of the scan window areas at the adjacent pixel position in the subsequent identification processing steps.

A relationship to an adjacent pixel position is also statistically determined by performing test processing using a large amount of sample image data in advance, as is the case with the above-described threshold value $\theta$. For example, the identification processing step is executed on an image capturing a human face, and an average value of the number of detected faces at pixel positions adjacent to a pixel position at which a face is detected is calculated. In the following example, criteria (a combination of identification evaluation values of adjacent pixels) for estimating a processing time in each of the arithmetic processing modules is set based on the number of the detected faces at the adjacent pixel positions which are statistically calculated as described above.

According to the present exemplary embodiment, when three or more pixels out of five pixels including a target pixel and two adjacent pixels each on the right and left of the target pixel are greater than the threshold value, the estimation processing module 14 determines that the identification processing step is likely to be continued even if the identification evaluation value of the target pixel is less than the threshold value. Then, the estimation processing module 14 estimates that a processing time of the arithmetic processing module 12A in which the identification processing step is being executed on the target pixel is Long and outputs the estimation result to the clock control module 15.

For example, as shown in FIG. 7, an identification evaluation value V3 (=50) of the arithmetic processing module <3> 12A-3 is less than the threshold value $\theta_{10}$ (=60), however, identification evaluation values V1, V2, and V4 of three pixels among two pixels each on the right and left of the relevant pixel are greater than the threshold value. In this case, the estimation processing module 14 estimates a processing time of the arithmetic processing module <3> 12A-3 as Long and outputs the estimation result to the clock control module 15.

When identification evaluation values of two adjacent pixels each on the right and left of a target pixel are used for estimation of a processing time, two pixels on both ends do not have identification evaluation values of two adjacent pixels each on the right and left thereof.

According to the present exemplary embodiment, regarding a pixel at each end, a processing time is estimated from identification evaluation values of three pixels including the relevant pixel and adjacent two pixels on the right side or the left side thereof. More specifically, a processing time of the arithmetic processing module <0> 12A-0 is estimated from identification evaluation values V0, V1, and V2 of the arithmetic processing module <0> 12A-0 to the arithmetic processing module <2> 12A-2. In addition, a processing time of the arithmetic processing module <7> 12A-7 is estimated from identification evaluation values V5, V6, and V7 of the arithmetic processing module <5> 12A-5 to the arithmetic processing module <7> 12A-7.

When identification evaluation values of two or more pixels among three pixels are greater than the threshold value, the estimation processing module 14 estimates that the identification processing step is likely to be continued on the target pixel. Then, the estimation processing module 14 estimates that a processing time of the arithmetic processing module 12A in which the identification processing step is being executed on the target pixel is Long and outputs the estimation result to the clock control module 15.

For example, as shown in FIG. 7, the identification evaluation value V0 (=50) of the arithmetic processing module <0> 12A-0 is less than the threshold value $\theta_{10}$ (=60), however, the identification evaluation values V1 and V2 of two pixels on the right side thereof are greater than the threshold value. In this case, the estimation processing module 14 estimates that the processing time of the arithmetic processing module <0> 12A-0 is Long and outputs the estimation result to the clock control module 15.

In addition, regarding a second pixel from each end, a processing time is estimated from identification evaluation values of four pixels including the relevant pixel and one adjacent pixel on the left and two adjacent pixels on the right, or the relevant pixel and two adjacent pixels on the left and one adjacent pixel on the right. More specifically, a processing time of an arithmetic processing module <1> 12A-1 is estimated from the identification evaluation values V0, V1, V2, and V3 of the arithmetic processing module <0> 12A-0 to the arithmetic processing module <3> 12A-3. A processing time of an arithmetic processing module <6> 12A-6 is estimated from the identification evaluation values V4, V5, V6, and V7 of the arithmetic processing module <4> 12A-4 to the arithmetic processing module <7> 12A-7.

When identification evaluation values of two or more pixels among four pixels are greater than the threshold value, the estimation processing module 14 estimates that the identification processing step is likely to be continued on the target pixel. Then, the estimation processing module 14 estimates that a processing time of the arithmetic processing module 12A in which the identification processing step is being executed on the target pixel is Long and outputs the estimation result to the clock control module 15. For example, as shown in FIG. 7, a processing time of the arithmetic processing module <1> 12A-1 is estimated as Long since the identification evaluation values V1 and V2 of two pixels among the four adjacent pixels including the target pixel are greater than the threshold value.

Contrary to the above-described example, if scan window areas having small identification evaluation values are concentrated in the vicinity of a certain scan window area having a large identification evaluation value, the estimation processing module 14 determines that the identification processing step in the certain scan window area is highly likely to be terminated. More specifically, it is regarded that the identification evaluation value of the certain scan window area becomes temporarily large and will change similarly to the identification evaluation values of the scan window areas at the adjacent pixel position in the subsequent identification processing steps.

According to the present exemplary embodiment, when four or more pixels out of five pixels including a target pixel and two adjacent pixels each on the right and left of the target pixel are less than the threshold value, the estimation processing module 14 determines that the identification processing step is likely to be terminated even if the identification evaluation value of the target pixel is greater than the threshold value. Then, the estimation processing module 14 estimates that a processing time of the arithmetic processing module 12A in which the identification processing step is being executed on the target pixel is Short and outputs the estimation result to the clock control module 15.

For example, as shown in FIG. 8A, an identification evaluation value V3 (=70) of the arithmetic processing module <3> 12A-3 is greater than the threshold value $\theta_{10}$ (=60), however, identification evaluation values V1, V2, V4, and V5 of four pixels among two pixels each on the right and left of the relevant pixel are less than the threshold value. In this case, the estimation processing module 14 estimates that the processing time of the arithmetic processing module <3> 12A-3 is Short and outputs the estimation result to the clock control module 15.

In this regards, this case is similar to the above-described example, and two pixels on both ends do not have identification evaluation values of two adjacent pixels each on the right and left thereof. Therefore, according to the present exemplary embodiment, a processing time is estimated from identification evaluation values of three pixels including the relevant pixel and adjacent two pixels on the right side or the left side thereof. When identification evaluation values of two or more pixels among three pixels are less than the threshold value, the estimation processing module 14 estimates that the identification processing step is likely to be terminated on the target pixel. Then, the estimation processing module 14 estimates that a processing time of the arithmetic processing module 12A in which the identification processing step is being executed on the target pixel is Short and outputs the estimation result to the clock control module 15.

For example, as shown in FIG. 8B, an identification evaluation value V0 (=70) of the arithmetic processing module <0> 12A-0 is greater than the threshold value $\theta_{10}$ (=60), however, identification evaluation values V1 and V2 of two pixels on the right thereof are less than the threshold value. In this case, the estimation processing module 14 estimates that the processing time of the arithmetic processing module <0> 12A-0 is Short and outputs the estimation result to the clock control module 15. Further, for example, an identification evaluation value V7 (=80) of the arithmetic processing module <7> 12A-7 is greater than the threshold value $\theta_{10}$ (=60), however, identification evaluation values V5 and V6 of two pixels on the left thereof are less than the threshold value. In this case, the estimation processing module 14 estimates that the processing time of the arithmetic processing module <7> 12A-7 is Short and outputs the estimation result to the clock control module 15.

In addition, regarding a second pixel from each end, a processing time is estimated from identification evaluation values of four pixels including the relevant pixel and one adjacent pixel on the left and two adjacent pixels on the right, or the relevant pixel and two adjacent pixels on the left and one adjacent pixel on the right. When identification evaluation values of three or more pixels among four pixels are less than the threshold value, the estimation processing module 14 estimates that the identification processing step is likely to be terminated on the target pixel. Then, the estimation processing module 14 estimates that a processing time of the arithmetic processing module 12A in which the identification processing step is being executed on the target pixel is Short and outputs the estimation result to the clock control module 15.

For example, as shown in FIG. 8C, a processing time of the arithmetic processing module <1> 12A-1 is estimated as Short since identification evaluation values V0, V2, and V3 of three pixels among the four adjacent pixels including the target pixel are less than the threshold value. Further, for example, a processing time of the arithmetic processing module <6> 12A-6 is estimated as Short since identification evaluation values V4, V5, and V7 of three pixels among the four adjacent pixels including the target pixel are less than the threshold value.

In addition, when an estimation result of a processing time is other than Long and Short, the estimation processing module 14 outputs Middle to the clock control module 15 as the estimation result of the processing time by the arithmetic processing module 12A.

Figure 9:
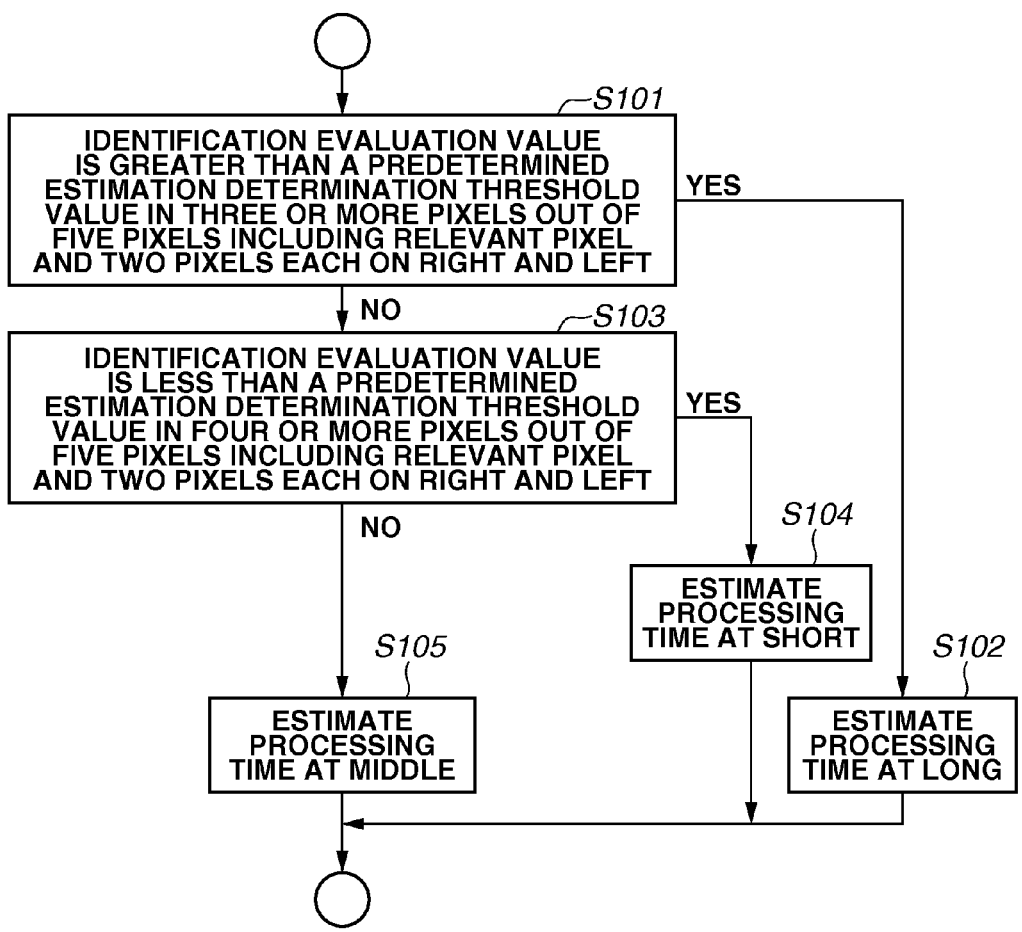
FIG. 9 is a flowchart illustrating an example of estimation processing of a processing time according to the first exemplary embodiment.

FIG. 9 illustrates a determination flow of a processing time of the arithmetic processing module 12A described above. FIG. 9 is an example of a determination flow when there are two adjacent pixels each on the right and left of a target pixel. More specifically, FIG. 9 illustrates a case in which identification evaluation values of five pixels including a target pixel and two adjacent pixels each on the right and left thereof are used to estimate a processing time of the arithmetic processing module 12A in which the identification processing step is being executed on the target pixel.

In the estimation processing of a processing time, in step S101, the estimation processing module 14 first determines whether an identification evaluation value is greater than a predetermined threshold value in three or more pixels out of the five pixels. When the identification evaluation value is greater than the predetermined threshold value in three or more pixels out of the five pixels (YES in step S101), in step S102, the estimation processing module 14 estimates that the processing time of the arithmetic processing module 12A is Long.

When the identification evaluation value is greater than the predetermined threshold value in less than three pixels (NO in step S101), in step S103, the estimation processing module 14 determines whether the identification evaluation value is less than the predetermined threshold value in four or more pixels out of the five pixels. When the identification evaluation value is less than the predetermined threshold value in four or more pixels out of the five pixels (YES in step S103), in step S104, the estimation processing module 14 estimates that the processing time of the arithmetic processing module 12A is Short.

When it is determined that the identification evaluation value is less than the predetermined threshold value in less than four pixels (NO in step S103), in step S105, the estimation processing module 14 estimates that the processing time of the arithmetic processing module 12A is Middle. There are eight arithmetic processing modules 12A according to the present exemplary embodiment, and thus the estimation processing module 14 executes the estimation processing of a processing time on each of the arithmetic processing modules and outputs each estimation result (total eight pieces) to the clock control module 15.

Next, processing executed in the clock control module 15 is described. The clock control module 15 generates a clock signal having a frequency to be supplied to each of the arithmetic processing modules 12A based on the reference clock signal (e.g. 200 MHz) supplied from the clock module 16.

According to the present exemplary embodiment, the clock control module 15 generates a clock signal having a frequency of, for example, 400 MHz corresponding to the estimation result, i.e. Long, of the processing time. Further, the clock control module 15 generates a clock signal having a frequency of, for example, 200 MHz corresponding to the estimation result, i.e. Middle, of the processing time, and generates a clock signal having a frequency of, for example, 100 MHz corresponding to the estimation result, i.e. Short, of the processing time. A clock signal having a frequency different from the reference clock signal (400 MHz or 100 MHz in the examples) can be easily generated using a commonly-used multiplication circuit or frequency division circuit based on the reference clock signal.

In addition, the clock control module 15 determines a frequency of a clock signal to be supplied by referring to the estimation result of the processing time of the each arithmetic processing module 12A input from the estimation processing module 14. Then, the clock control module 15 supplies the each arithmetic processing module 12A with the clock signal having the frequency corresponding to the each estimation result. In FIG. 1, output lines from the clock control module 15 are illustrated in a divided state so as to indicate that a frequency of a clock signal supplied to each of the arithmetic processing modules 12A can be different.

As described above, the clock control module 15 controls a frequency of a clock signal supplied to each of the arithmetic processing modules 12A according to processing times of the respective arithmetic processing modules 12A estimated during execution of the processing. A frequency of a clock signal is set to high for the arithmetic processing module 12A of which estimated processing time is long, and a frequency of a clock signal is set to low for the arithmetic processing module 12A of which estimated processing time is short. As described above, a frequency of a clock signal to be supplied is controlled in response to a status of the processing being executed in the each arithmetic processing module 12A, so that processing times of the plurality of the arithmetic processing modules 12A operated in parallel can be equalized.

Accordingly, when a plurality of the arithmetic processing modules operates in parallel, an entire processing time can be prevented from being rate-controlled by some arithmetic processing modules of which processing times are long. In addition, when a plurality of the arithmetic processing modules operates in parallel, the present exemplary embodiment can reduce useless power consumption caused by supplying a clock signal having an unnecessarily high frequency to some arithmetic processing modules of which processing times are short.

According to the present exemplary embodiment, the above-described control of a frequency of a clock signal to be supplied to the each arithmetic processing module 12A is executed for every tenth step in the identification processing steps in the cascade type detection processing. From the first to the tenth steps in the identification processing steps, a clock signal having a frequency same as that of the reference clock signal is supplied to all of the arithmetic processing modules 12A. The control of a frequency of a clock signal to be supplied to the each arithmetic processing module 12A is not limited to every tenth step in the identification processing steps as described above and can be executed at appropriate steps if necessary. In addition, a frequency of a clock signal at the start of the identification processing steps (the first step) is not limited to the above-described example, and, for example, a frequency selected in a last identification processing step of each pixel position of a previous image frame can be applied thereto.

The parallel processing processor according to the first exemplary embodiment determines a frequency of a clock signal to be supplied to each arithmetic processing module 12A according to evaluation values and combinations thereof which are obtained in the identification processing step being executed in respective arithmetic processing modules 12A. Since a frequency of a clock signal is determined by referring to statuses of the other identification processing steps executed in parallel, control of the clock signal can be realized more accurately based on similarity of data in adjacent pixels without being influenced by temporary variation of evaluation values of the relevant pixel. Therefore, a frequency of a clock signal to be supplied to the each arithmetic processing module 12A can be accurately controlled in response to a status of the processing being executed, and reduction of a processing time and reduction of power consumption can be both realized in the parallel processing processor.

According to the present exemplary embodiment, eight arithmetic processing modules 12A are arranged in parallel in the parallel processing processor, however, the number of the arithmetic processing modules is not limited to eight. In addition, evaluation values of the each arithmetic processing module 12A and combinations thereof that the estimation processing module 14 refers to for estimating a processing time of the each arithmetic processing module 12A are not limited to those described in the present exemplary embodiment, and other values and combinations may be used. For example, a changing rate of the above-described identification evaluation value may be used as an evaluation value There are various methods for calculating a changing rate of an identification evaluation value. The simplest method is, for example, to calculate a difference value between identification evaluation values of current and previous identification processing steps and regard the difference value as the changing rate of the identification evaluation value. In this case, the each arithmetic processing module stores the identification evaluation value of the previous identification processing step, calculates a difference value between the stored identification evaluation value and an identification evaluation value calculated in a next identification processing step, and regards the difference value as the evaluation value.

Evaluation values are not limited to the above-described ones, and other values may be used, which are described in below. The reference clock signal and a frequency of a clock signal supplied to each of the arithmetic processing modules are also not limited to the above-described examples, and other values may be used. Further, according to the present exemplary embodiment, the cascade type detection processing is described as an example. However, the present exemplary embodiment can be applied to other processing as long as the processing parallely processes input data pieces positionally adjacent to each other and a processing time of each parallel processing is not fixed.

Figure 10:
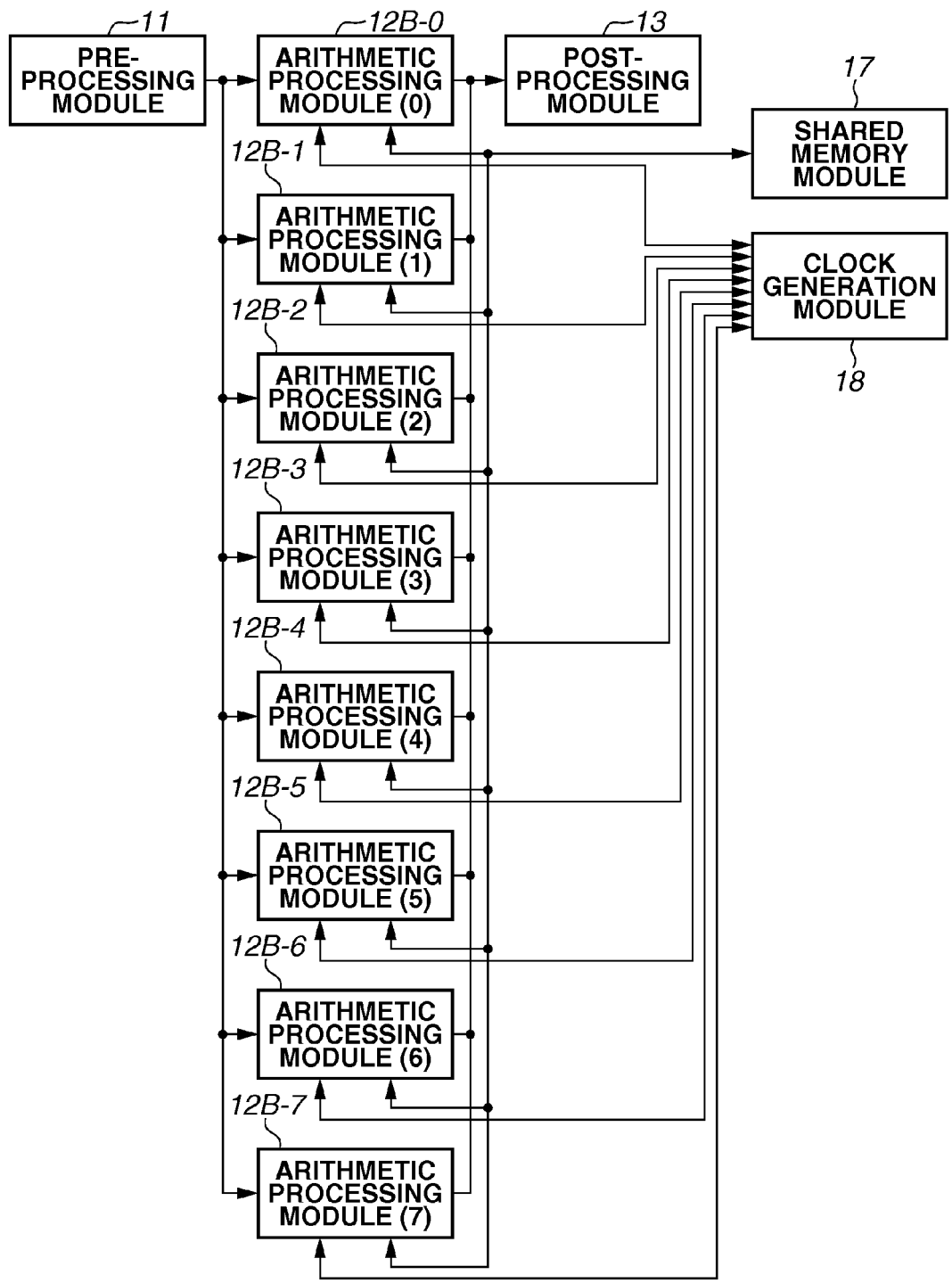
FIG. 10 illustrates a configuration example of an information processing apparatus according to a second exemplary embodiment.

Next, a second exemplary embodiment of the present invention is described. FIG. 10 is a block diagram illustrating a configuration example of a parallel processing processor as an information processing apparatus according to the second exemplary embodiment. In FIG. 10, blocks having the same function as the blocks illustrated in FIG. 1 are denoted by the same reference numerals, and the descriptions thereof are omitted. The parallel processing processor according to the second exemplary embodiment includes the pre-processing module 11, a plurality of arithmetic processing modules 12B (12B-0 to 12B-7), the post-processing module 13, a shared memory module 17, and a clock generation module 18.

With respect to data input to the parallel processing processor, the pre-processing module 11 executes predetermined pre-processing, the arithmetic processing modules 12B execute predetermined arithmetic processing in parallel, and the post-processing module 13 executes predetermined post-processing. The shared memory module 17 stores an evaluation value based on a status of processing being executed which is calculated in the arithmetic processing module 12B when the processing is being executed. The clock generation module 18 generates a clock signal to be supplied to the arithmetic processing module 12B. The clock generation module 18 generates a plurality of clock signals having different frequencies.

Each arithmetic processing module 12B estimates a processing time based on evaluation values of the plurality of the arithmetic processing modules 12B stored in the shared memory module 17 and determines a frequency of a clock signal to be supplied thereto based on the estimated processing time. Then, the each arithmetic processing module 12B selects and receives a clock signal having the frequency determined based on the estimated processing time from among a plurality of clock signals generated by the clock generation module 18.

The parallel processing processor according to the second exemplary embodiment is different from the parallel processing processor according to the first exemplary embodiment in the following respects. The parallel processing processor according to the second exemplary embodiment includes the shared memory module 17 instead of the estimation processing module 14. Each arithmetic processing module 12B refers to evaluation values of the other arithmetic processing modules 12B stored in the shared memory module 17 to estimate a processing time of the arithmetic processing module. Then, the each arithmetic processing module 12B selects and receives a clock signal having a frequency corresponding to the estimated processing time from among clock signals generated by the clock generation module 18. Differences from the parallel processing processor according to the first exemplary embodiment are described below, and descriptions of other parts similar to the first exemplary embodiment are omitted.

The parallel processing processor according to the second exemplary embodiment executes face detection processing for detecting a human face as an example of processing, as is the case with the first exemplary embodiment. More specifically, the pre-processing module executes pre-processing for calculating an integral image on an input image. The plurality of the arithmetic processing modules 12B-0 to 12B-7 each perform cascade type detection processing for detecting a human face in parallel based on the integral image calculated by the pre-processing module 11. The post-processing module 13 executes post-processing for integrating detection results calculated by the respective arithmetic processing modules 12B-0 to 12B-7.

Next, a method is described which is for controlling a frequency of a clock signal to be supplied to the arithmetic processing module 12B when the cascade type detection processing step 102 is executed according to the second exemplary embodiment. As with the plurality of the arithmetic processing modules 12A according to the first exemplary embodiment, the plurality of the arithmetic processing modules 12B executes the cascade type detection processing step 102 in parallel on a scan window area which is handled by each arithmetic processing module. At that time, the each arithmetic processing module 12B outputs an identification evaluation value calculated in each identification processing step in the cascade type detection processing step 102 to the shared memory module as needed. The shared memory module 17 stores the identification evaluation value of the each arithmetic processing module 12B in a predetermined area corresponding to the each arithmetic processing module.

In addition, the each arithmetic processing module 12B executes processing for estimating a processing time of the cascade type detection processing step being executed in its own module based on the identification evaluation values of the plurality of the arithmetic processing modules 12B stored in the shared memory module 17 and combinations of the evaluation values. According to the present exemplary embodiment, the each arithmetic processing module 12B also estimates a processing time of the cascade type detection processing step being executed in its own module in three types including Long, Middle, and Short. Estimation processing of a processing time according to the second exemplary embodiment is different from that in the first exemplary embodiment at the point that the each arithmetic processing module 12B performs estimation processing regarding its own module. Other points are similar to the estimation processing executed by the estimation processing module 14 according to the first exemplary embodiment, so that the descriptions are omitted.

The arithmetic processing module <0> 12B-0 estimates a processing time of the cascade type detection processing step being executed in its own module based on identification evaluation values V0, V1, and V2 of the arithmetic processing module <0> 12B-0 to the arithmetic processing module <2> 12B-2. The arithmetic processing module <1> 12B-1 estimates a processing time of the cascade type detection processing step being executed in its own module based on the identification evaluation values V0, V1, V2, and V3 of the arithmetic processing module <0> 12B-0 to the arithmetic processing module <3> 12B-3.

The arithmetic processing module <6> 12B-6 estimates a processing time of the cascade type detection processing step being executed in its own module based on identification evaluation values V4, V5, V6, and V7 of the arithmetic processing module <4> 12B-4 to the arithmetic processing module <7> 12B-7. The arithmetic processing module <7> 12B-7 estimates a processing time of the cascade type detection processing step being executed in its own module based on the identification evaluation values V5, V6, and V7 of the arithmetic processing module <5> 12B-5 to the arithmetic processing module <7> 12B-7.

Each of the other arithmetic processing modules 12B estimates a processing time of the cascade type detection processing step being executed in its own module based on identification evaluation values of the relevant arithmetic processing module and the arithmetic processing modules corresponding to two adjacent pixels each on the right and the left thereof.

Next, selection and reception of a clock signal by the arithmetic processing module 12B and the clock generation module 18 are described. The clock generation module 18 generates a clock signal having a frequency to be supplied to each of the arithmetic processing modules 12B based on the reference clock signal (e.g., 200 MHz).

According to the present exemplary embodiment, the clock generation module 18 generates a clock signal having a frequency of, for example, 400 MHz corresponding to the estimation result, i.e. Long, of the processing time. Further, the clock generation module 18 generates a clock signal having a frequency of, for example, 200 MHz corresponding to the estimation result, i.e. Middle, of the processing time, and generates a clock signal having a frequency of, for example, 100 MHz corresponding to the estimation result, i.e. Short, of the processing time. A clock signal having a frequency different from each other can be easily generated using a commonly-used multiplication circuit or frequency division circuit based on the reference clock signal.

The arithmetic processing modules 12B each output an estimation result of a processing time to the clock generation module 18 and thus select and receive a clock signal having a frequency corresponding to the estimation result of the processing time. The clock generation module includes selectors corresponding to each of the arithmetic processing modules 12B. Any one of the three types of the clock signals generated by the clock generation module 18 is selected in response to an input (any one of Long, Middle, and Short) of the estimation result of the processing time from the arithmetic processing module 12B and supplied to the arithmetic processing module.

As described above, a frequency of a clock signal supplied to the each arithmetic processing module 12B is controlled according to the processing time estimated in the each arithmetic processing module 12B during the execution of the processing. A frequency of a clock signal is set high for the arithmetic processing module 12B of which estimated processing time is long, and a frequency of a clock signal is set low for the arithmetic processing module 12B of which estimated processing time is short. As described above, a frequency of a clock signal to be supplied is controlled in response to a status of the processing being executed in the each arithmetic processing module 12B, so that processing times of the plurality of the arithmetic processing modules 12B operated in parallel can be equalized, as is the case with the first exemplary embodiment.

Accordingly, when a plurality of the arithmetic processing modules operates in parallel, an entire processing time can be prevented from being rate-controlled by some arithmetic processing modules of which processing times are long. In addition, when a plurality of the arithmetic processing modules operates in parallel, the present exemplary embodiment can reduce useless power consumption caused by supplying a clock signal having an unnecessarily high frequency to some arithmetic processing modules of which processing times are short.

According to the present exemplary embodiment, the above-described control of a frequency of a clock signal to be supplied to the each arithmetic processing module 12B is executed for every tenth step in the identification processing steps in the cascade type detection processing. A frequency of a clock signal in the first to the tenth steps in the identification processing steps is set to 200 MHz, that is a reference frequency, since the arithmetic processing module 12B outputs Middle as a default value of the estimation result of the processing time. In other words, a clock signal having a frequency of 200 MHz, that is the reference frequency, is supplied to all of the arithmetic processing modules 12B.

The parallel processing processor according to the second exemplary embodiment determines a frequency of a clock signal to be supplied to each arithmetic processing module 12B according to evaluation values and combinations thereof which are obtained in the identification processing step being executed in the each arithmetic processing module 12B. Since a frequency of a clock signal is determined by referring to statuses of the other identification processing steps executed in parallel, control of the clock signal can be realized more accurately based on similarity of data in adjacent pixels without being influenced by temporary variation of evaluation values of the relevant pixel. Therefore, a frequency of a clock signal to be supplied to the each arithmetic processing module 12B can be accurately controlled in response to a status of the processing being executed, and reduction of a processing time and reduction of power consumption can be both realized in the parallel processing processor.

According to the present exemplary embodiment, eight arithmetic processing modules 12B are arranged in parallel in the parallel processing processor, however, the number of the arithmetic processing modules is not limited to eight. In addition, evaluation values of the each arithmetic processing module 12B and combinations thereof that the each arithmetic processing module 12B refers to for estimating a processing time are not limited to those described in the present exemplary embodiment, and other values and combinations may be used. The reference clock signal and a frequency of a clock signal supplied to each of the arithmetic processing modules are also not limited to the above-described examples, and other values may be used.

Further, according to the present exemplary embodiment, a timing at which an identification evaluation value of the identification processing step being executed in the each arithmetic processing module 12B is stored in the shared memory module 17 is not limited to the tenth step described as an example. For example, the each arithmetic processing module 12B may output identification evaluation values of all identification processing steps and store the evaluation values in the shared memory module 17. Then, the arithmetic processing module 12B can determine a timing of the above-described estimation processing of the processing time (and a timing for switching selection and reception of a clock signal) based on the evaluation value of the identification processing step being executed in the each arithmetic processing module 12B.

For example, the each arithmetic processing module 12B may execute the estimation processing of the processing time (and switching processing of selection and reception of a clock signal) only when an evaluation value of the identification processing step being executed becomes equal to or greater than a predetermined threshold value or less than the predetermined threshold value. Further, for example, the each arithmetic processing module 12B may execute the estimation processing of the processing time (and switching processing of selection and reception of a clock signal) only when a difference value between an evaluation value of the identification processing step being executed and an evaluation value of the previous identification processing step becomes equal to or greater than a predetermined threshold value or less than the predetermined threshold value.

In these cases, the selection and reception of a clock signal can be individually switched according to a status of the identification processing step in each arithmetic processing module, so that the present exemplary embodiment can realize the selection and reception of a clock signal more flexibly. Further, estimation processing of a processing time and switching of selection and reception of a clock signal are executed according to a status of the identification processing step, so that the present exemplary embodiment can avoid uselessly executing processing when the identification processing step is not changed.

Figure 11:
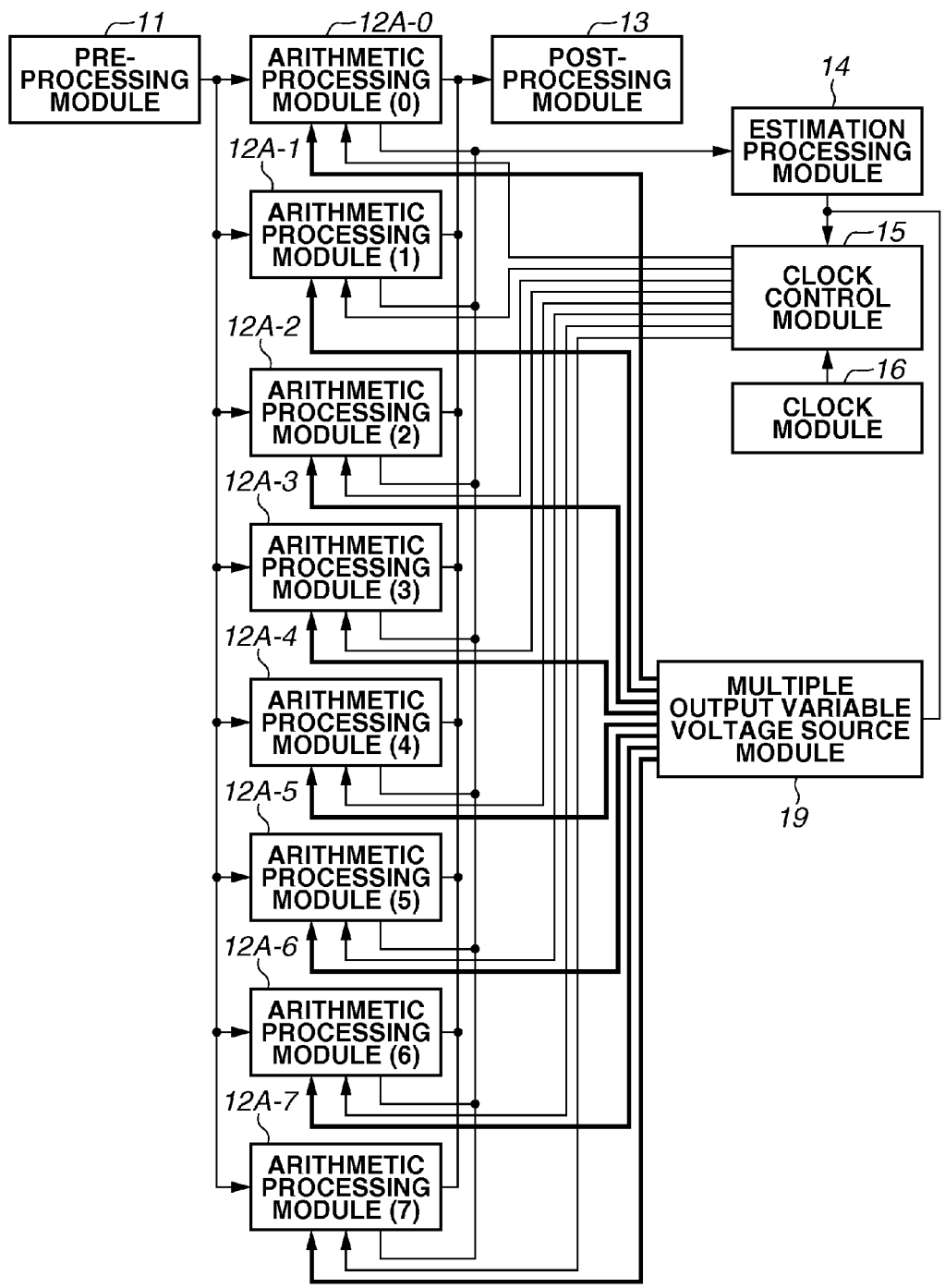
FIG. 11 illustrates a configuration example of an information processing apparatus according to a third exemplary embodiment.

Next, a third exemplary embodiment of the present invention is described. FIG. 11 is a block diagram illustrating a configuration example of a parallel processing processor as an information processing apparatus according to the third exemplary embodiment. In FIG. 11, blocks having the same function as the blocks illustrated in FIG. 1 are denoted by the same reference numerals, and the descriptions thereof are omitted. The parallel processing processor according to the third exemplary embodiment illustrated in FIG. 11 includes a multiple output variable voltage source module 19 functioning as a power source voltage control unit in addition to the parallel processing processor according to the first exemplary embodiment illustrated in FIG. 1.

More specifically, the parallel processing processor according to the first exemplary embodiment controls a frequency of a clock signal to be supplied to each arithmetic processing module 12A based on an evaluation value reflecting a status of the identification processing step being executed in the each arithmetic processing module 12A. The parallel processing processor according to the third exemplary embodiment controls a power source voltage value to be supplied to each of the arithmetic processing modules 12A in addition to control of a frequency of a clock signal. Therefore, the descriptions of the functions which have been described in the first exemplary embodiment are omitted, and functions specific to the third exemplary embodiment are described below.

The parallel processing processor according to the third exemplary embodiment is similar to the parallel processing processor according to the first exemplary embodiment and controls a frequency of a clock signal to be supplied to the arithmetic processing module 12A when the cascade type detection processing step is executed. Generally, when a frequency of a clock signal to be supplied is lowered, a power source voltage can be lowered at the same time. More specifically, when a frequency of a clock signal is lowered, a circuit operation is not hindered when a transition time of a signal in the circuit becomes larger. Therefore, according to the third exemplary embodiment, a power source voltage value with which a circuit operates normally when a frequency of a clock signal is 400 MHz is regarded as a basis, and a lower power source is supplied to the arithmetic processing module 12A to which a clock signal having a frequency of 200 MHz or 100 MHz is supplied.

A method for controlling a power source voltage according to the third exemplary embodiment is described below. The estimation processing module 14 estimates that a processing time of the arithmetic processing module 12A in which the identification processing step is being executed is any of Long, Middle, or Short and outputs the estimation result to the multiple output variable voltage source module 19, as is the case with the first exemplary embodiment. The multiple output variable voltage source module 19 outputs a power source voltage VL, a power source voltage VM, or a power source voltage VS respectively corresponding to the input estimation result, Long, Middle, or Short, of the processing time and supplies the output power source voltage to the arithmetic processing module 12A. The power source voltage values VL, VM, and VS have a relationship of VL>VM>VS.

In this regard, it is confirmed in advance that each of the power source voltage values VL, VM, and VS does not hinder a circuit operation when each of the arithmetic processing modules 12A are operated at a clock signal having a frequency corresponding to the power source voltage values. The multiple output variable voltage source module 19 can have a configuration which includes three voltage sources corresponding to the three types of power source voltage values and outputs to each arithmetic processing modules 12A a power source voltage value corresponding to the estimation result of the processing time of the each arithmetic processing module 12A, as a simplest configuration. The multiple output variable voltage source module 19 can have various embodiments other than the above-described examples. However, those are not main points of the present invention and thus descriptions thereof are omitted.

Figure 12:
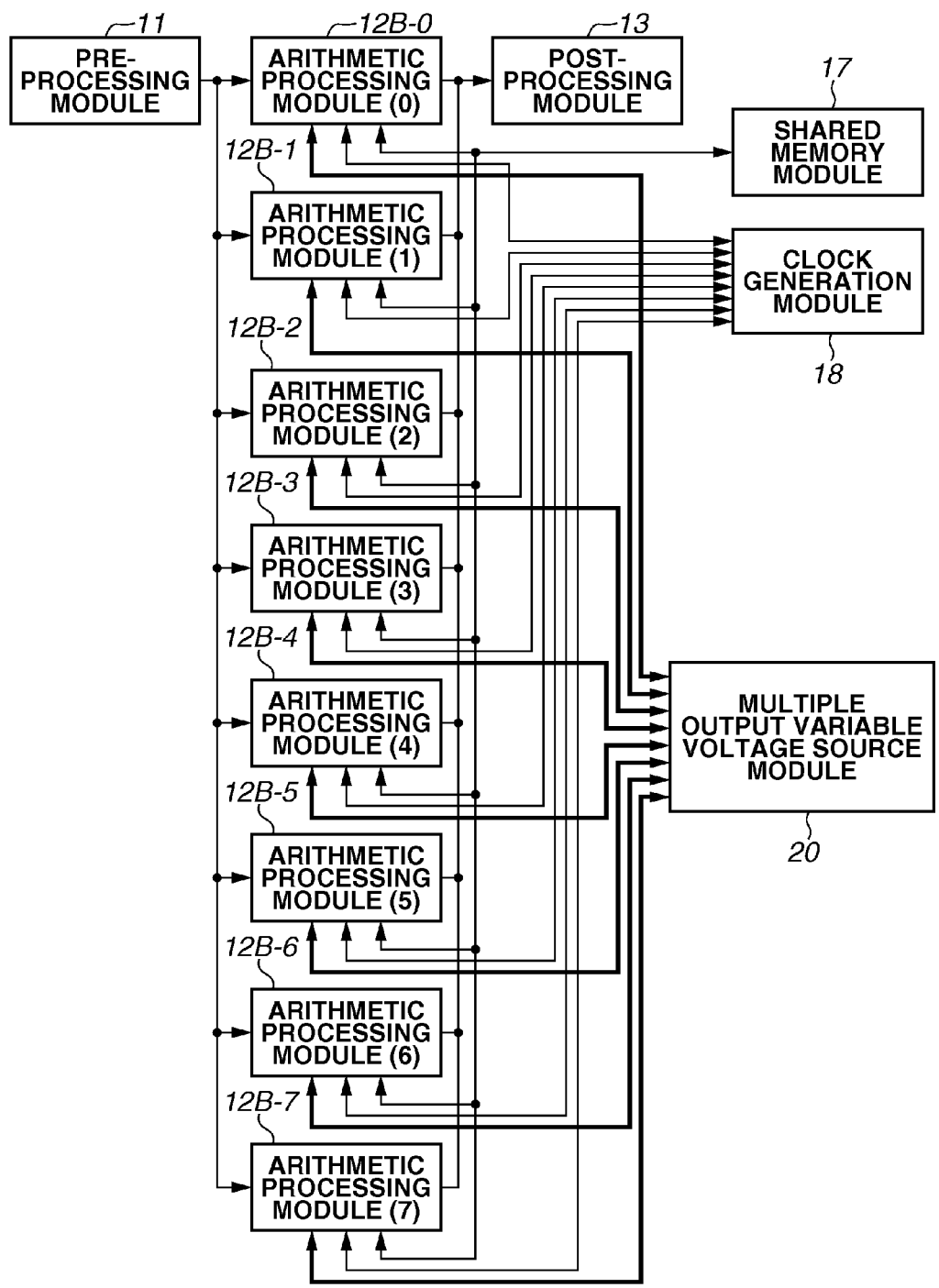
FIG. 12 illustrates another configuration example of the information processing apparatus according to the third exemplary embodiment.

As a modification of the present exemplary embodiment, as illustrated in FIG. 12, a multiple output variable voltage source module 20 functioning as a power source voltage control unit may be added to the parallel processing processor according to the second exemplary embodiment illustrated in FIG. 10. More specifically, in the parallel processing processor according to the second exemplary embodiment, each of the arithmetic processing modules 12B selects and receives a clock signal having a frequency corresponding to the estimated processing time from among clock signals according to the estimated processing time. In the parallel processing processor according to the third exemplary embodiment, a power source voltage to be supplied is selected and received in addition to a clock signal having a frequency corresponding to the estimation result of the processing time. The descriptions of the functions, which have been described in the second exemplary embodiment and the present exemplary embodiment, are omitted, and functions specific to the modification of the present exemplary embodiment are described below.

The parallel processing processor according to the modification of the present exemplary embodiment illustrated in FIG. 12 is similar to the parallel processing processor according to the second exemplary embodiment, and the arithmetic processing module 12B selects and receives a clock signal having a frequency corresponding to the estimated processing time from among clock signals when the cascade type detection processing step is executed. According to the modification of the present exemplary embodiment, each of the arithmetic processing modules 12B selects and receives a power source voltage signal corresponding to a frequency of a clock signal from among a plurality of power source voltages generated by the multiple output variable voltage source module 20.

As illustrated in FIG. 12, each of the arithmetic processing modules 12B outputs an estimation result of the processing time to the multiple output variable voltage source module 20. The multiple output variable voltage source module 20 generates three types of power source voltage signals corresponding to the estimation result of the processing time input from the arithmetic processing module 12B. More specifically, the multiple output variable voltage source module 20 generates the power source voltage VL, the power source voltage VM, or the power source voltage VS respectively corresponding to the estimation result, Long, Middle, or Short, of the processing time. The power source voltage values VL, VM, and VS have a relationship of VL>VM>VS. Any one of the three types of the power source voltage signals is selected to correspond to the estimation result of the processing time input from each arithmetic processing module 12B and supplied to the each arithmetic processing module 12B.

The parallel processing processor according to the third exemplary embodiment controls a power source voltage value to be supplied to the arithmetic processing module in addition to a frequency of a clock signal and thus can realize further reduction of power consumption.

Figure 13:
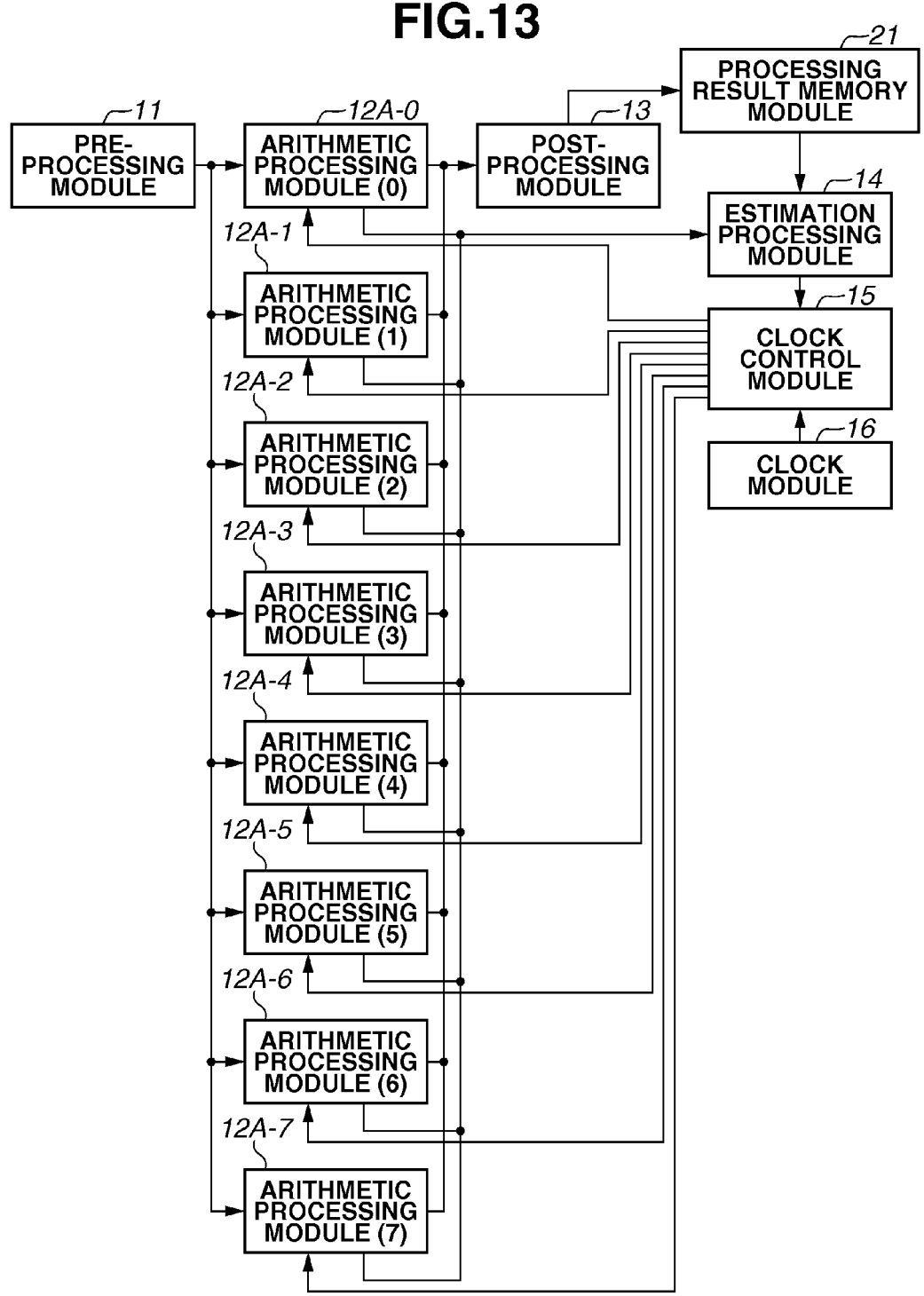
FIG. 13 illustrates a configuration example of an information processing apparatus according to a fourth exemplary embodiment.

Next, a fourth exemplary embodiment of the present invention is described. FIG. 13 is a block diagram illustrating a configuration example of a parallel processing processor as an information processing apparatus according to the fourth exemplary embodiment. In FIG. 13, blocks having the same function as the blocks illustrated in FIG. 1 are denoted by the same reference numerals, and the descriptions thereof are omitted. The parallel processing processor according to the fourth exemplary embodiment illustrated in FIG. 13 includes a processing result memory module 21 for storing a previous processing result in addition to the parallel processing processor according to the first exemplary embodiment illustrated in FIG. 1

More specifically, the parallel processing processor according to the first exemplary embodiment controls a frequency of a clock signal to be supplied to each arithmetic processing module 12A based on an evaluation value reflecting a status of the identification processing step being executed in the each arithmetic processing module 12A. The parallel processing processor according to the fourth exemplary embodiment further refers to a previous processing result including a processing result of a pixel adjacent to the target pixel and controls a frequency of a clock signal to be supplied to the each arithmetic processing module 12A. The descriptions of the functions, which have been described in the first exemplary embodiment, are omitted, and functions specific to the fourth exemplary embodiment are described below.

The parallel processing processor according to the fourth exemplary embodiment executes face detection processing similarly to the first exemplary embodiment and particularly supposes a case in which input image data is a moving image. For example, image data is captured at a video rate of 30 frames per second (30 fps) and input to the parallel processing processor.

A method is described which is for controlling a frequency of a clock signal to be supplied to the arithmetic processing module 12A when the cascade type detection processing step is executed according to the present exemplary embodiment. According to the present exemplary embodiment, a result of the face detection processing regarding one frame image is stored in the processing result memory module 21. A data format of a processing result to be stored in the processing result memory module 21 includes, for example, a method for setting a detection flag (1: detected, 0: undetected) to all pixel positions in an image and a method for storing address information of a pixel position at which a face is detected in an image. Both of the methods can be employed, and in the descriptions below, the present exemplary embodiment employs the method for setting a detection flag to all pixel positions in an image.

According to the present exemplary embodiment, when a frequency of a clock signal to be supplied to the arithmetic processing module 12A is controlled, an evaluation value reflecting a status of the identification processing step being executed in each of the arithmetic processing modules 12A is referred to, as is the case with the first exemplary embodiment. Further, according to the present exemplary embodiment, a result of the previous face detection processing stored in the processing result memory module 21 is referred to at the same time. Particularly, not only a processing result of the relevant pixel but also processing results of adjacent pixels are referred to as the result of the previous face detection processing.

For example, the estimation processing module 14 first estimates a processing time of each arithmetic processing module 12A based on evaluation values of the identification processing step and combinations thereof in the cascade type detection processing step being executed, as is the case with the first exemplary embodiment. A method for estimating a processing time used here is similar to that in the first exemplary embodiment, but an estimated processing time is regarded as a temporary estimation time. More specifically, the estimation results Long, Middle, and Short according to the first exemplary embodiment are respectively associated with TempLong, TempMiddle, and TempShort.

Figure 14:
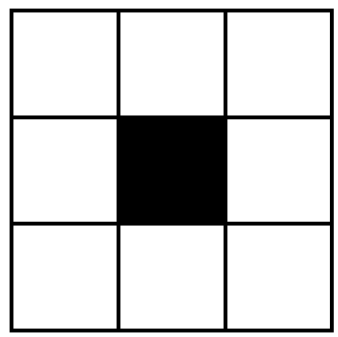
FIG. 14 illustrates an example of a reference pixel position according to the fourth exemplary embodiment.

Further, according to the present exemplary embodiment, the estimation processing module 14 reads out previous detection results of pixel positions adjacent to a pixel position corresponding to the each arithmetic processing module 12A from the processing result memory module 21. For example, according to the present exemplary embodiment, the estimation processing module 14 reads out previous processing results of three-by-three adjacent pixel positions including the relevant pixel position (a black portion in the drawing) as illustrated in FIG. 14.

For example, when the estimation result is TempShort and a face is detected in the nine adjacent pixels of the previous processing result, the estimation processing module 14 determines a final estimation result of the processing time as Middle. When a face is not detected in the nine adjacent pixels of the previous processing result, the estimation processing module 14 determines a final estimation result of the processing time as Short. Further, when the estimation result is TempMiddle and a face is detected in the nine adjacent pixels of the previous processing result, the estimation processing module 14 determines a final estimation result of the processing time as Long. When a face is not detected in the nine adjacent pixels of the previous processing result, the estimation processing module 14 determines a final estimation result of the processing time as Short. Furthermore, when the estimation result is TempLong and a face is detected in the nine adjacent pixels of the previous processing result, the estimation processing module 14 determines a final estimation result of the processing time as Long. When a face is not detected in the nine adjacent pixels of the previous processing result, the estimation processing module 14 determines a final estimation result of the processing time as Middle.

The estimation processing module 14 outputs the estimation result of the processing time determined as described above to the clock control module 15. The clock control module 15 generates a clock signal having a frequency corresponding to the input estimation result of the processing time of each arithmetic processing module 12A and supplies the clock signal to the each arithmetic processing module 12A, as is the case with the first exemplary embodiment. Processing other than the above is similar to that in the first exemplary embodiment, so that descriptions thereof are omitted.

As described above, the parallel processing processor according to the fourth exemplary embodiment further refers to a previous processing result including a processing result of a pixel particularly adjacent to a target pixel in addition to a status of the identification processing step being executed in each of the arithmetic processing modules 12A and controls a frequency of a clock signal. For example, in the case that a processing target is a moving image, if a relative speed between a camera and an object is small with respect to an imaging frame rate, a moving amount of the object between image frames is small, and a detection target object (a human face in the present exemplary embodiment) is highly likely to be detected at an adjacent pixel position in a next frame. Therefore, controlling a frequency of a clock signal by referring to both processing results of a pixel spatially adjacent to the target pixel and a pixel temporally adjacent to the target pixel enables the present exemplary embodiment to realize control of a clock signal based on more accurate estimation of a processing time.

According to the above-described example, a processing result of the face detection processing stored in the processing result memory module 21 is overwritten every time the next face detection processing is completed, however, processing results may be stored in the processing result memory module 21 for a plurality of frames. In this case, information of a pixel temporally adjacent to the target pixel can be referred to in the preceding few frames.

Further, according to the above-described example, a processing result of the face detection processing stored in the processing result memory module 21 is a processing result which has been subjected to the post-processing (integration processing), however, a result of the face detection processing which has not been subjected to the post-processing may be stored in the processing result memory module 21. In this case, a result which is the identification evaluation value as it is without being subjected to the integration processing is referred to, so that information of a pixel in the previous frame can more directly referred to.

Furthermore, according to the above-described example, the processing result memory module 21 for storing a previous processing result is further added to the configuration of the first exemplary embodiment. However, the processing result memory module can be added to the second exemplary embodiment and the third exemplary embodiment in the similar manner.

Next, a fifth exemplary embodiment of the present invention is described. The parallel processing processor according to the fifth exemplary embodiment estimates a processing time based on a predetermined arithmetic result regarding a plurality of identification evaluation values when the estimation processing module 14 estimates a processing time of each arithmetic processing module 12A in the parallel processing processor according to the first exemplary embodiment. More specifically, according to the first exemplary embodiment, a processing time is estimated by comparing an identification evaluation value of a pixel adjacent to the relevant pixel with the predetermined threshold value. According to the fifth exemplary embodiment, a processing time is estimated by performing predetermined arithmetic operation on an identification evaluation value of a pixel adjacent to the relevant pixel.

For example, according to the present exemplary embodiment, the estimation processing module 14 executes the predetermined arithmetic operation using an identification evaluation value at a position of a target pixel and an identification evaluation value of an adjacent pixel and regards an arithmetic result as an estimation result of a processing time of the target pixel. For example, calculation of $T3=a*V1+B*V2+c*V3+b*V4+a*V5$ is performed using the identification evaluation value $V3$ of the arithmetic processing module 12A-3 and the identification evaluation values $V1$, $V2$, $V4$, and $V5$ of the arithmetic processing modules 12A corresponding to the adjacent pixels. "a", "b", and "c" are weighting parameters for identification evaluation values, and $T3$ is an estimated processing time of the relevant pixel.

According to the fifth exemplary embodiment, the estimation processing module 14 outputs the estimated processing time calculated for each arithmetic processing module to the clock control module 15. The clock control module 15 generates a clock signal having a frequency corresponding to the estimated processing time and outputs the clock signal to each arithmetic processing module based on the input estimated processing time. For example, the clock control module 15 stores a frequency table discretely set according to estimated processing times as illustrated in FIG. 15 and refers the frequency table based on an input estimated processing time T to generate a clock signal having a frequency corresponding to the estimated processing time T.

Figure 16:
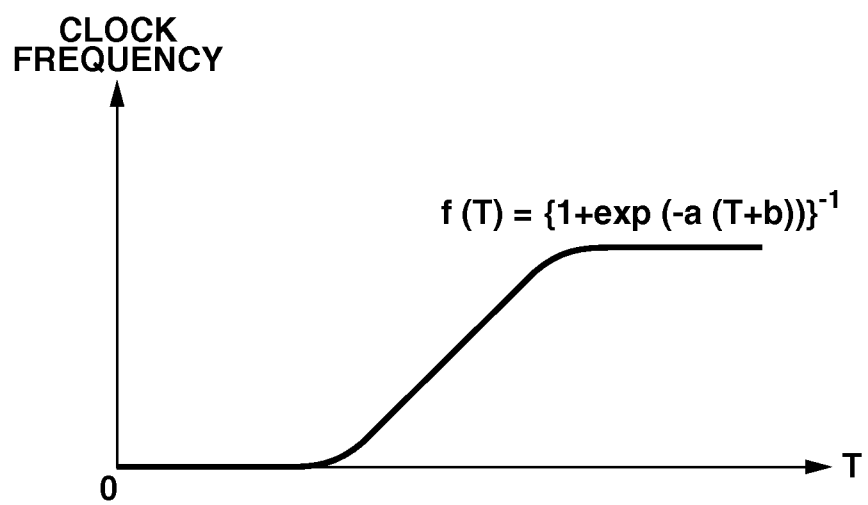
FIG. 16 is an example of an arithmetic function according to the fifth exemplary embodiment.

The clock control module 15 may further execute predetermined calculation on the input estimated processing time to determine a corresponding frequency. For example, the clock control module 15 may apply a sigmoid function as shown in FIG. 16 to an estimated processing time to determine a frequency of a clock signal and generate a clock signal having a frequency corresponding thereto. "a" and "b" in an equation in FIG. 16 are parameters for determining a form of the sigmoid function.

As described above in the present exemplary embodiment, a method for estimating a processing time in each arithmetic processing module and a method for determining a frequency of a clock signal can use a reference table or employ an arithmetic expression. In this case, estimation of a processing time and determination of a frequency of a clock signal can be executed in more detail based on the identification evaluation values which reflect statuses of the identification processing steps being executed in each of the arithmetic processing modules. Further, in the above-described example, a method for estimating a processing time and a method for determining a frequency of a clock signal are changed from those in the first exemplary embodiment, however, the similar change can be applied to the second exemplary embodiment, the third exemplary embodiment, and the fourth exemplary embodiment.

Figure 17:
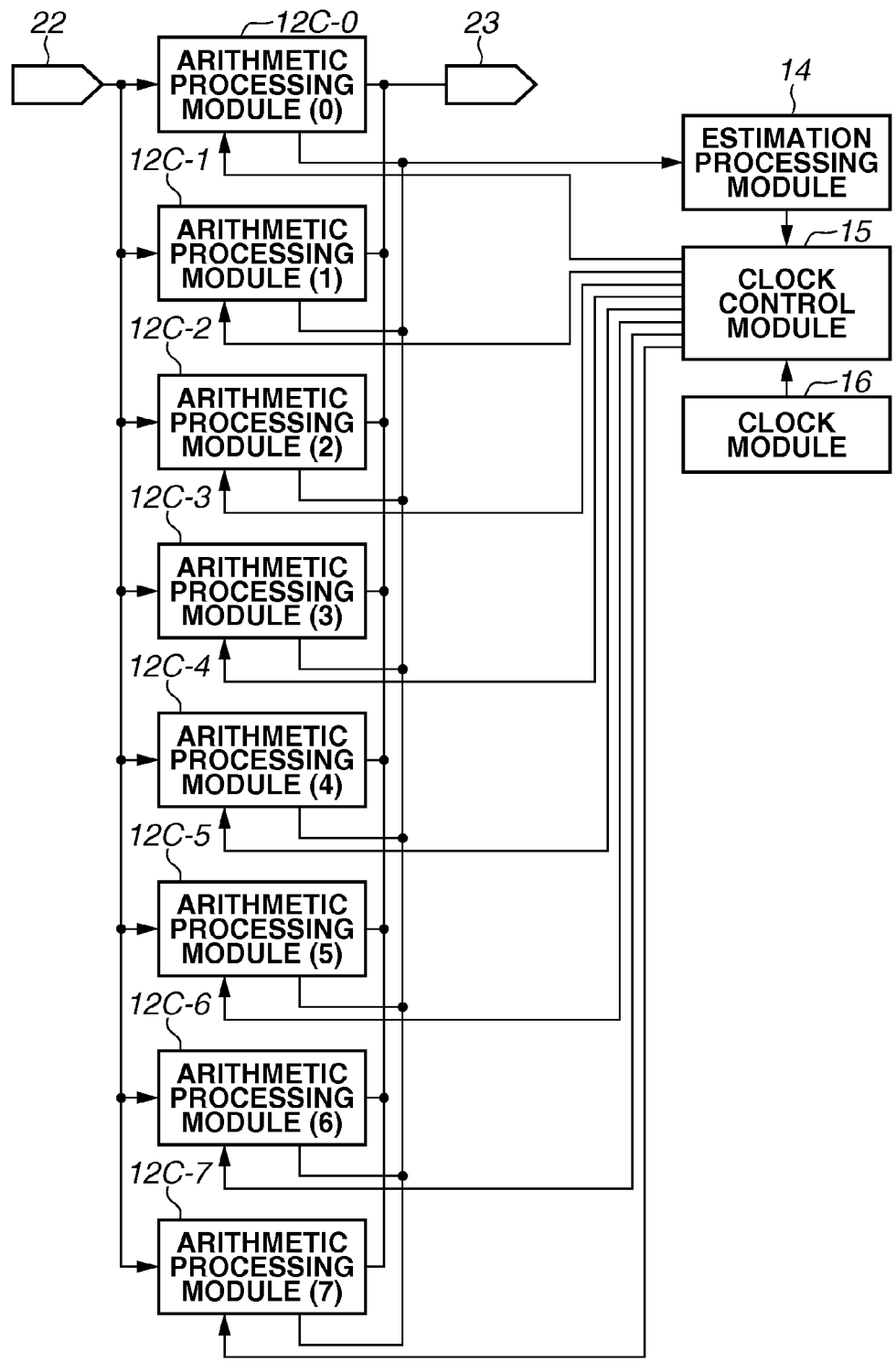
FIG. 17 illustrates a configuration example of an information processing apparatus according to a sixth exemplary embodiment.

Next, a sixth exemplary embodiment of the present invention is described. FIG. 17 is a block diagram illustrating a configuration example of a parallel processing processor as an information processing apparatus according to the sixth exemplary embodiment. The parallel processing processor according to the sixth exemplary embodiment includes a plurality of the arithmetic processing modules 12C (12C-0 to 12C-7), the estimation processing module 14, the clock control module 15, and the clock module 16. In FIG. 17, a data input terminal 22 and an arithmetic result output terminal 23 corresponding to the arithmetic processing module are illustrated to facilitate understanding of input and output of data, which are omitted in drawings of the parallel processing processor according to the first exemplary embodiment to the fifth exemplary embodiment.

With respect to data input to the parallel processing processor, the arithmetic processing modules 12C execute predetermined arithmetic processing in parallel. The estimation processing module 14 estimates processing times of the respective arithmetic processing modules 12C based on evaluation values calculated in the arithmetic processing modules 12C when the processing is being executed. The clock control module 15 generates clock signals to be supplied to the arithmetic processing modules 12C based on a reference clock signal. In addition, the clock control module 15 determines a frequency of the clock signal supplied to the each arithmetic processing module 12C according to the processing time of the arithmetic processing module 12C estimated by the estimation processing module 14. The clock module 16 generates the reference clock signal supplied to the clock control module 15.

According to the sixth exemplary embodiment, the parallel processing processor executes processing for calculating distance information from an image on which a predetermined projection pattern is projected, as an example. Processing for calculating distance information from an image is described, for example, in Japanese Patent Application Laid-Open No. 2008-276743. According to the present exemplary embodiment described below, a projection pattern is formed by a bar code as described in the above-mentioned reference. Since detailed processing contents are described in the above-mentioned reference, they are omitted here, and the parallel processing processor according to the present exemplary embodiment executes processing as described below.

Figure 18:
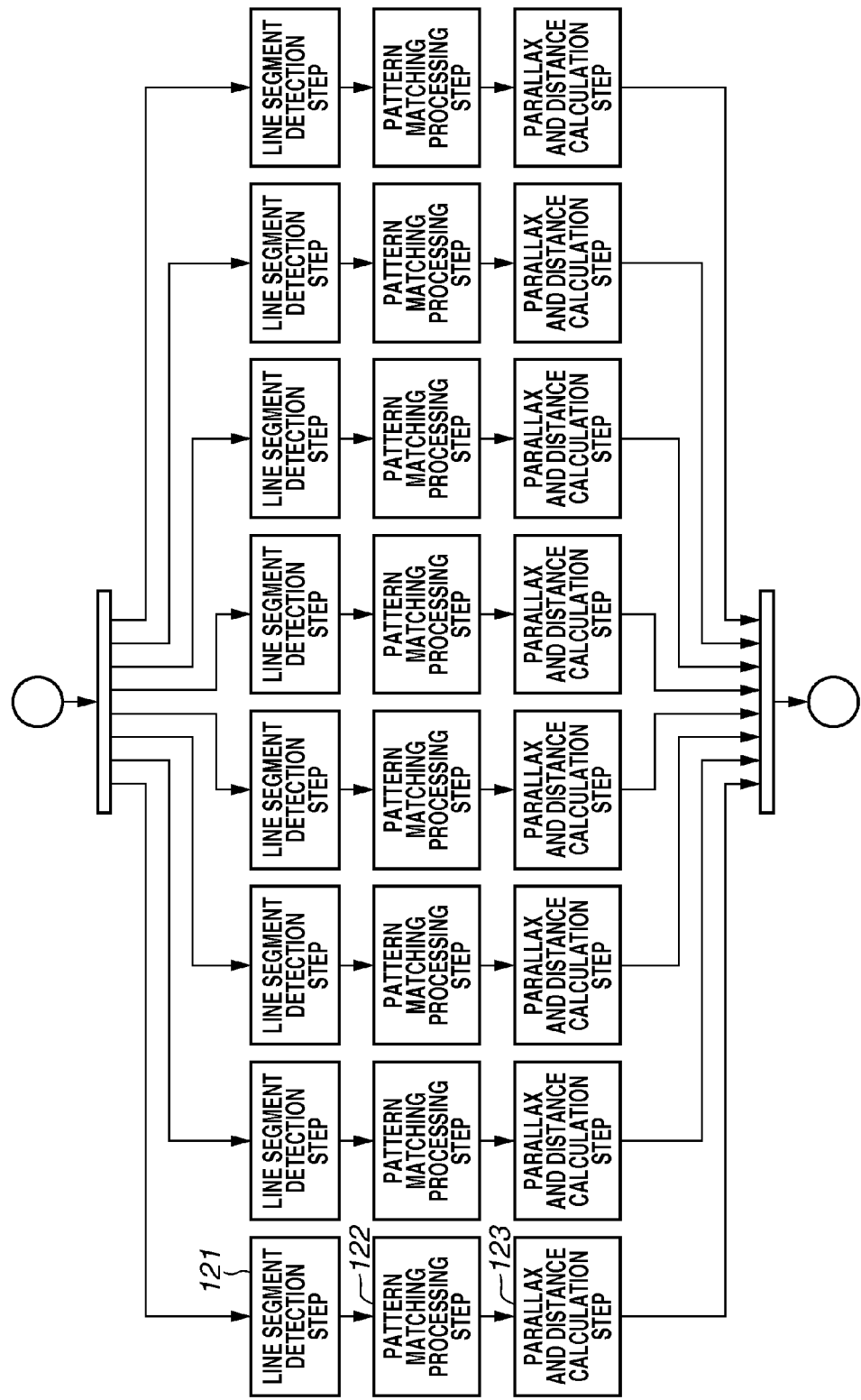
FIG. 18 is a flowchart illustrating distance information calculation processing according to the sixth exemplary embodiment.

FIG. 18 is a flowchart illustrating distance information calculation processing according to the sixth exemplary embodiment. First, the parallel processing processor according to the present exemplary embodiment executes a line segment detection step 121 for detecting a line segment in an input image. Then, the parallel processing processor executes a pattern matching processing step 122 on the detected line segment image for detecting to which portion in a projection pattern a pattern including each line segment corresponds.

The pattern matching processing step 122 corresponds to processing for determining whether a combination of line segments (hereinbelow, referred to as a line segment pattern) detected in the line segment detection step 121 conforms to a bar code in the projection pattern. More specifically, when the number of line segments detected in the line segment detection step 121 is larger, the combinations of the line segments to be determined its conformity to the bar code increase, so that a processing time of the pattern matching processing step 122 increases.

Then, the parallel processing processor executes a parallax and distance calculation step 123 on the line segment pattern conforming to the projection pattern in the pattern matching processing step 122 for calculating parallax information from a position on each image and further calculating distance information from the parallax information. A method for calculating parallax information and a method for calculating distance information from the parallax information are widely known, so that detailed descriptions thereof are omitted. Processing for calculating parallax information and processing for calculating distance information from the parallax information executed in the parallax and distance calculation step 123 are executed only at a pixel position of the line segment pattern conforming to the projection pattern. Therefore, as described below, a processing time of the parallax and distance calculation step 123 increases or decreases in response to the number of the detected line segment patterns which conform to the projection pattern.

Figure 19:
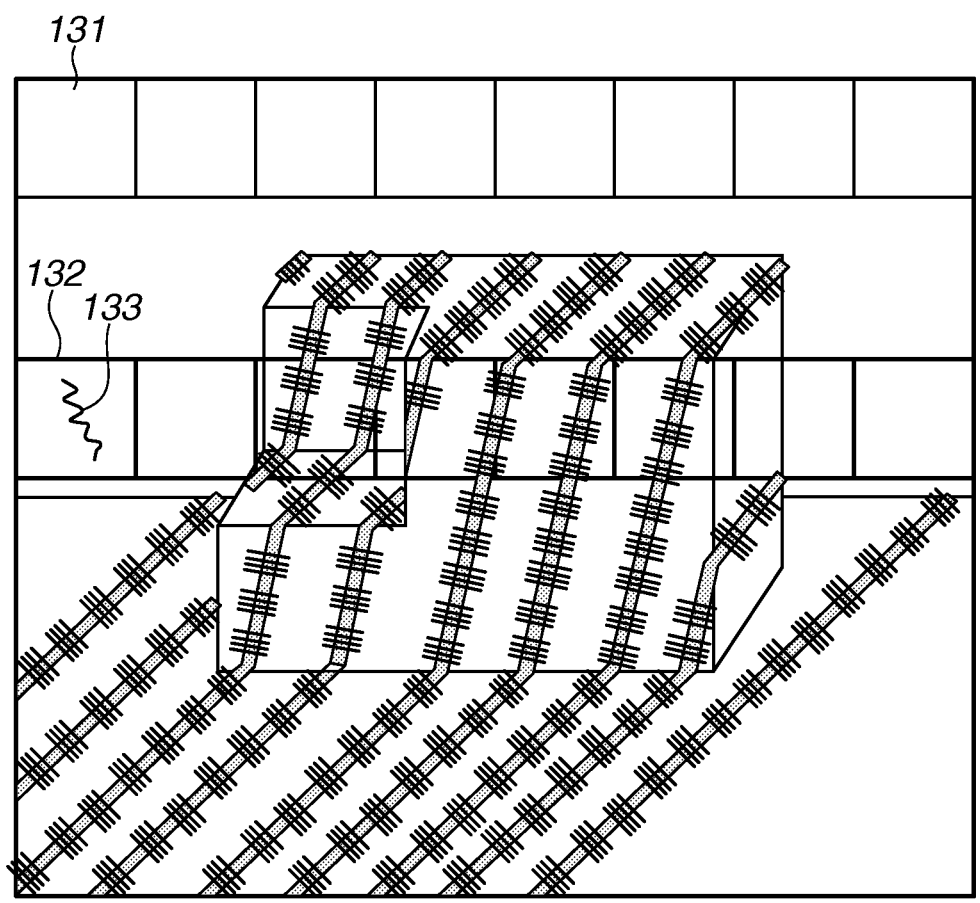
FIG. 19 illustrates an example of an image and a scan window according to the sixth exemplary embodiment.

The above-described distance information calculation processing is executed by the arithmetic processing modules 12C in parallel. According to the present exemplary embodiment, an input image is divided into a plurality of areas 131 as illustrated in FIG. 19, and processing is executed in parallel by assigning the arithmetic processing module 12C to each divided image. For example, in an example in FIG. 19, a topmost part of an image is divided into eight areas.

In addition, an example of image data to be an arithmetic target is also shown in FIG. 19. In the image, a target object (an object in the middle of the image) from which distance information is calculated is captured in a state that projection patterns including barcodes are projected thereon. As can be seen from FIG. 19, the projection patterns are generally detected on a surface of the target object and rarely detected at other portions due to a relationship to a focus setting of a projector or the like.

A processing time executed by the arithmetic processing module 12C in each divided area varies in response to the number of the detected line segment patterns which conform to the projection pattern. Therefore, when the arithmetic processing modules 12C execute the arithmetic operation in parallel for each divided area, the processing times become non-uniform as described above, and the arithmetic processing modules 12C may stall. In response, a method can be considered which equalizes processing times of each of the arithmetic processing modules by controlling a frequency of a clock signal according to the number of line segments detected in each arithmetic processing module. However, line segments actually detected from an image include a line segment which does not correspond to the projection pattern, and thus the number of the detected line segments may not always reflect the processing time of each arithmetic processing module.

On the other hand, regarding the above-described divided area, as can be seen from eight divided areas illustrated in the middle of the image in FIG. 19, it can be thought that areas including the target object are often adjacent to each other and areas not including the target object are often adjacent to each other by analogy with continuity of the target object. Thus, according to the present exemplary embodiment, the arithmetic processing module 12C executing processing in parallel refers to a processing status of another arithmetic processing module executing processing of an adjacent divided area, as is the case with the above-described exemplary embodiments. Accordingly, estimation accuracy of a processing time can be improved in each arithmetic processing module 12C.

First, as with the first exemplary embodiment, test processing is performed in advance using a large amount of sample image data to statistically determine a predetermined threshold value. For example, distance information calculation processing is executed on an image capturing a measurement target as sample image data to calculate an average value of the number of detected line segments in an area in which bar codes of the projection pattern are detected, and the average value is set as a predetermined threshold value in advance.

In this regard, for example, supposing that the number of the detected line segments in a certain arithmetic processing module 12C is greater than the predetermined threshold value. However, if the number of the detected line segments of the arithmetic processing module 12C corresponding to the adjacent divided area is less than the predetermined threshold value, the line segments detected in the relevant area may not be the one of the projection pattern by analogy with continuity of the target object. For example, as in the case of a flaw 133 on a remotely located wall which is captured in a divided area 132 in FIG. 19, the detected line segment may not be the one of the projection pattern.

Conversely, supposing that the number of detected line segments in a certain arithmetic processing module 12C is less than the predetermined threshold value. However, if the number of the detected line segments of the arithmetic processing module 12C corresponding to the adjacent divided area is greater than the predetermined threshold value, the line segments detected in the relevant area may be the one of the projection pattern by analogy with continuity of the target object.

Therefore, according to the present exemplary embodiment, the estimation processing module 14 makes a determination based on five divided areas including a target divided area and two divided areas each on the right and left of the target divided area. When the number of the detected line segments is greater than the threshold value in three or more divided areas out of the five divided areas, the estimation processing module 14 determines that it is highly likely that the number of the line segment patterns conforming to the projection pattern is large even if the number of the detected line segments is small in the relevant divided area. Then, the estimation processing module 14 estimates that a processing time of the arithmetic processing module 12C which executes the arithmetic operation on the relevant divided area is Long and outputs the estimation result to the clock control module 15.

For example, as shown in FIG. 20A, the number of detected line segments (evaluation value) V3 (=50) of the arithmetic processing module <3> 12C-3 is less than the threshold value θ (=60), however, the number of detected line segments V1, V2, and V4 in three divided areas among two divided areas each on the right and left of the relevant divided area are greater than the threshold value. In this case, the estimation processing module 14 estimates that the processing time of the arithmetic processing module <3> 12C-3 is Long and outputs the estimation result to the clock control module 15.

Conversely, when the number of the detected line segments is less than the threshold value in four or more divided areas out of the five divided areas, the estimation processing module 14 determines that it is highly likely that the number of the line segment patterns conforming to the projection pattern is small even if the number of the detected line segments is large in the relevant divided area. Then, the estimation processing module 14 estimates that a processing time of the arithmetic processing module 12C which executes the arithmetic operation on the relevant divided area is Short and outputs the estimation result to the clock control module 15.

For example, as shown in FIG. 20B, the number of detected line segments V3 (=70) of the arithmetic processing module <3> 12C-3 is greater than the threshold value θ (=60), however, the number of detected line segments V1, V2, V4, and V5 in two divided areas each on the right and left of the relevant divided areas are less than the threshold value. In this case, the estimation processing module 14 estimates that the processing time of the arithmetic processing module <3> 12C-3 is Short and outputs the estimation result to the clock control module 15.

In addition, when an estimation result of a processing time is other than Long and Short, the estimation processing module 14 outputs Middle to the clock control module 15 as the estimation result of the processing time by the arithmetic processing module 12C.

Combinations of adjacent divided areas are also statistically determined by performing test processing using a large amount of sample image data in advance, as is the case with the above-described predetermined threshold value. For example, distance information calculation processing is executed on an image capturing a measurement target as sample image data to calculate an average value of the number of adjacent divided areas of which number of the detected line segments exceeds the threshold value. Criteria of the above-described combinations of adjacent divided areas is set based on an average value of the number of the adjacent divided areas which is statistically calculated.

Operations of the estimation processing module 14, the clock control module 15, and the clock module 16 are basically similar to those in the first exemplary embodiment, so that detailed descriptions thereof are omitted.

The parallel processing processor according to the sixth exemplary embodiment determines a frequency of a clock signal to be supplied to each arithmetic processing module 12C according to the number of detected line segments and combinations of the number of detected line segments in adjacent divided areas in the arithmetic processing being executed in respective arithmetic processing modules 12C. Since a frequency of a clock signal is determined by referring to statuses of other processing steps executed in parallel, control of the clock signal can be realized more accurately based on similarity of data pieces in adjacent divided areas without being influenced by the number of detected line segments in the relevant divided area. Therefore, a frequency of a clock signal to be supplied to the each arithmetic processing module 12C can be accurately controlled in response to a status of the processing being executed, and reduction of a processing time and reduction of power consumption can be both realized in the parallel processing processor.

Further, the configuration in which distance information calculation processing is applied to the first exemplary embodiment is described above as the example, and the distance information calculation processing can be similarly applied to the second exemplary embodiment to the fifth exemplary embodiment.

Furthermore, according to the above-described exemplary embodiments, the parallel processing processor as an information processing apparatus according to the exemplary embodiments of the present invention is described based on distance information calculation processing and face detection processing. However, processing to which the present invention is applied is not limited to the above-described processing. The present invention can be applied to other processing as long as processing parallely processes input data pieces which are positionally or temporally adjacent to each other and a processing time in each parallel processing varies depending on the data and is not fixed.

According to the above-described exemplary embodiments, a processing time of each of a plurality of arithmetic processing units can be dynamically estimated, and a frequency of a clock signal to be supplied can be controlled according to processing executed, so that reduction of a processing time and reduction of power consumption can be both realized in an information processing apparatus.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-007860 filed Jan. 20, 2014, which is hereby incorporated by reference herein in its entirety.

What is claimed is:

1. An information processing apparatus comprising:
a plurality of processing units configured to execute predetermined processing in parallel on respective input data which are spatially or temporally near to each other, and output respective intermediate results of the executed processing;
an estimation unit configured to estimate a processing time required for each one of the plurality of processing units to complete the predetermined processing based on intermediate results output from the each one of the plurality of processing units and at least one other processing unit from the plurality of the processing units, respectively; and
a clock control unit configured to, with respect to each one of the plurality of processing units, determine a frequency of a clock signal to be supplied to the each one of the plurality of processing units in accordance with the estimated processing time for the each one of the plurality of processing units and supply the clock signal having the determined frequency to the each one of the plurality of processing units.

2. The information processing apparatus according to claim 1, wherein the at least one other processing unit is configured to process input data spatially or temporally adjacent to input data to a processing unit of interest.

3. The information processing apparatus according to claim 1, further comprising a clock generation unit configured to generate a plurality of clock signals having different frequencies,
wherein the clock control unit selects one clock signal from the plurality of clock signals generated by the clock generation unit and supplies the selected clock signal based on the estimated processing time.

4. The information processing apparatus according to claim 1, wherein the estimation unit estimates the processing time required for each one of the plurality of processing units based on the newly calculated intermediate results output from the each one of the plurality of processing units and intermediate results previously calculated by the each one of the plurality of processing units and at least one other processing unit.

5. The information processing apparatus according to claim 1, wherein an intermediate result calculated by the estimation unit varies according to input data.

6. The information processing apparatus according to claim 1, further comprising a voltage control unit configured to control a value of a power source voltage to be supplied to the each one of the plurality of processing units in accordance with the frequency of the clock signal supplied to the each one of the plurality of processing units.

7. The information processing apparatus according to claim 1, wherein the predetermined processing is a series of sub-processings, and the intermediate result is a result of a sub-processing in the series of sub-processings.

8. The information processing apparatus according to claim 1, wherein the predetermined processing is processing for detecting a specific pattern.

9. The information processing apparatus according to claim 1, wherein the estimation unit estimates the processing time of the each one of the plurality of the processing units based on combinations of a plurality of the evaluation values.

10. A method for controlling an information processing apparatus, the method comprising:
    causing a plurality of processing units to execute predetermined processing in parallel on respective input data which are spatially or temporally near to each other and output respective intermediate results of the executed processing;
    estimating a processing time required for each one of the plurality of the processing units to complete the predetermined processing based on intermediate results output from the each one of the plurality of processing units and at least one other processing unit from the plurality of the processing units, respectively; and
    determining a frequency of a clock signal to be supplied to the each one of the processing units in accordance with the estimated processing time for the each one of the plurality of processing units and supplying the clock signal having the determined frequency to the each one of the plurality processing units.

11. A non-transitory computer-readable storage medium storing a computer program for causing a computer to execute a method for controlling an information processing apparatus, the method comprising:
    causing a plurality of processing units to execute predetermined processing in parallel on respective input data which are spatially or temporally near to each other and output respective intermediate results of the executed processing;
    estimating a processing time required for each one of the plurality of the processing units to complete the predetermined processing based on intermediate results output from the each one of the plurality of processing units and at least one other processing unit from the plurality of the processing units, respectively; and
    determining a frequency of a clock signal to be supplied to the each one of the processing units in accordance with the estimated processing time for the each one of the plurality of processing units and supplying the clock signal having the determined frequency to the each one of the plurality processing units.

* * * * *